US011010884B2

(12) United States Patent
Nabavi et al.

(10) Patent No.: US 11,010,884 B2
(45) Date of Patent: May 18, 2021

(54) SYSTEM AND METHOD FOR EVALUATING DISPLAYS OF ELECTRONIC DEVICES

(71) Applicant: Logiciel Asset Science Inc., Montreal (CA)

(72) Inventors: Navid Nabavi, Montreal (CA); Daniel Brisson, Montreal (CA)

(73) Assignee: Logiciel Asset Science Inc., Montreal (CA)

( * ) Notice: Subject to any disclaimer, the term of this patent is extended or adjusted under 35 U.S.C. 154(b) by 101 days.

(21) Appl. No.: 16/119,270

(22) Filed: Aug. 31, 2018

(65) Prior Publication Data

US 2020/0074615 A1    Mar. 5, 2020

(51) Int. Cl.
*G06K 9/32* (2006.01)
*G06T 7/00* (2017.01)
(Continued)

(52) U.S. Cl.
CPC .......... *G06T 7/0004* (2013.01); *G06K 9/3216* (2013.01); *G06K 9/4633* (2013.01);
(Continued)

(58) Field of Classification Search
CPC ................ H01L 22/12; G01N 21/9501; G01N 21/8851; G01N 21/88; G01N 21/95; G01N 21/8806; G01N 2021/8858; G01N 2021/8874; G01N 2021/8877; G01N 2021/887; G03F 1/38; G03F 1/42; G03F 1/44; G06T 7/70; G06T 2207/30148; G06T 2207/30164; G06T 7/0008; G06T 7/0004; G06T 7/13; G06T 7/00; G06T 2207/30121; B23Q 17/2452; B23Q 17/2457; B23Q 17/2471; B23Q 17/249; G05B 2219/31432; G05B 2219/36251; G05B 2219/37555; G05B 2219/37578; G05B 2219/50064; G06K 9/40; G06K 9/48; G06K 9/3216; G06K 9/4633; G06K 9/52; G06K 9/6267; G06K 9/62; H04N 5/23222;
(Continued)

(56) References Cited

U.S. PATENT DOCUMENTS 6,023,334 A    2/2000  Itagaki
10,007,934 B2  6/2018  Nguyen
(Continued)

OTHER PUBLICATIONS

Logiciel Asset Science Inc., CellMD—Apple App Store webpage, May 11, 2018, Apple.com, United States.

*Primary Examiner* — Duy M Dang
(74) *Attorney, Agent, or Firm* — Gardiner Roberts LLP; Robert Nakano

(57) ABSTRACT

The disclosure relates to a method, device and system for detecting a crack in a display of an electronic device. The method comprises: locating the electronic device in front of a reflective surface; aligning the electronic device to an alignment position relative to the reflective surface; generating an image on the display through instructions executed on a processor operating on the device; capturing a reflected image shown in the reflective surface of the image with a camera; processing the reflected image to identify a line in the image through instructions executed on the processor; and determining whether the line represents a crack in the display through instructions executed on the processor.

20 Claims, 19 Drawing Sheets

(51) Int. Cl.
  *G06K 9/46* (2006.01)
  *G06T 7/13* (2017.01)
  *H04N 5/232* (2006.01)

(52) U.S. Cl.
  CPC ...... *G06T 7/13* (2017.01); *G06T 2207/30121* (2013.01); *H04N 5/23212* (2013.01)

(58) Field of Classification Search
  CPC .. H04N 5/23225; H04N 5/2258; H04N 5/225; H04N 5/232; G06Q 30/0278; G06Q 30/02
  See application file for complete search history.

(56) References Cited

U.S. PATENT DOCUMENTS

2017/0301078 A1* 10/2017 Forutanpour ......... G06T 7/0004
2017/0372465 A1* 12/2017 Forutanpour ...... C12N 15/8247

\* cited by examiner

Fig. 4A
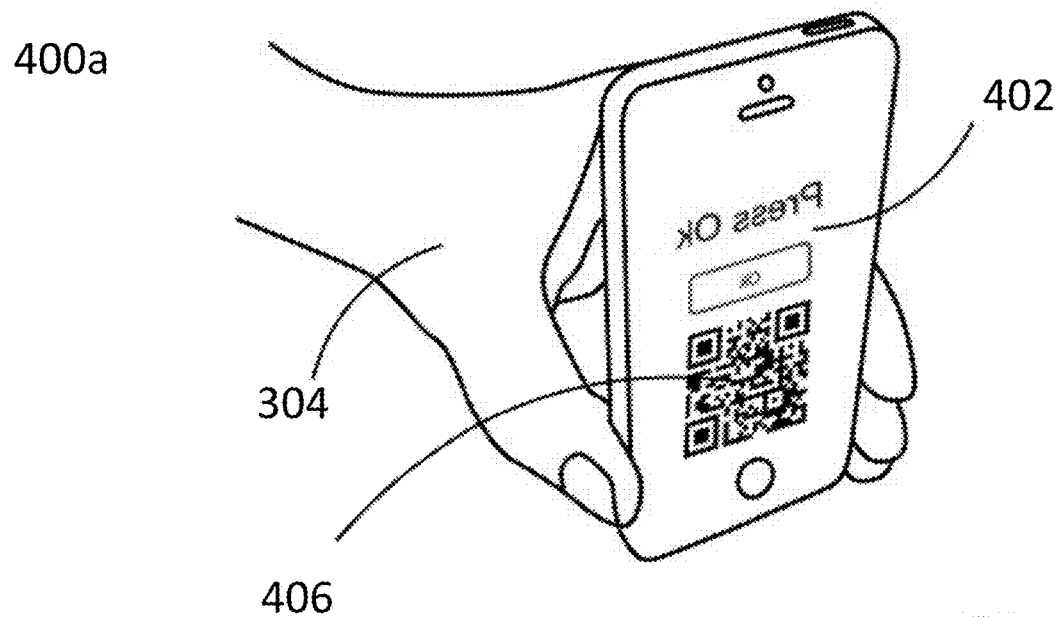
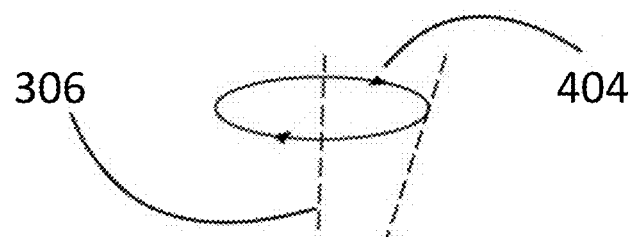
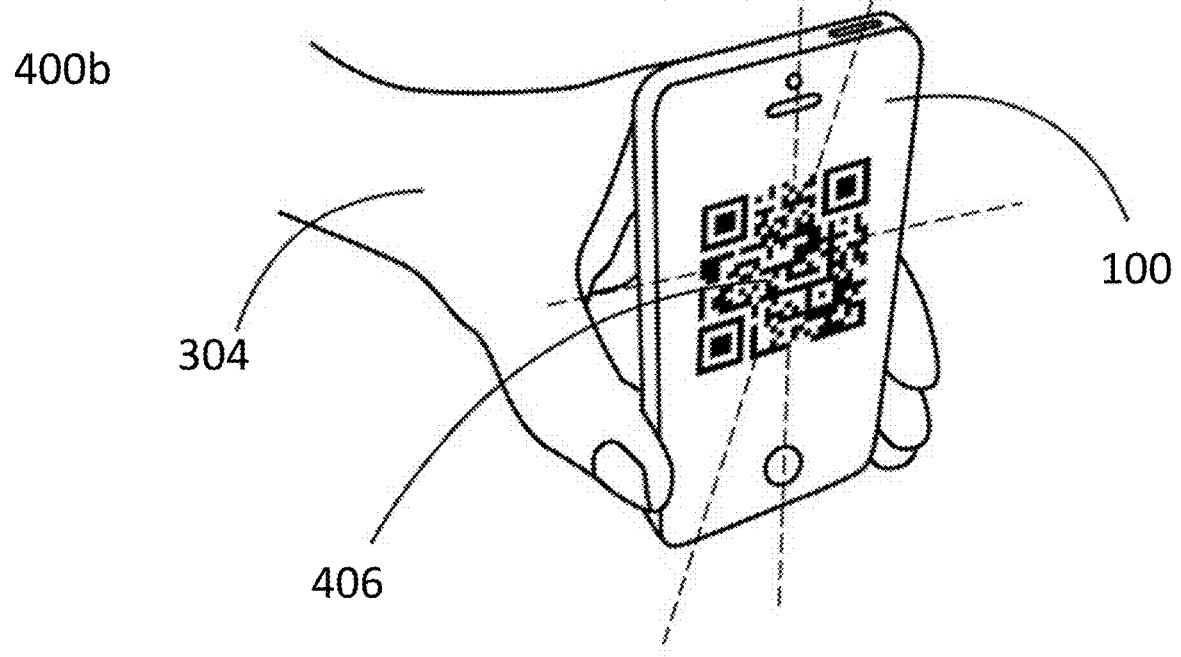
Fig. 4B

1200a

1200b

SYSTEM AND METHOD FOR EVALUATING DISPLAYS OF ELECTRONIC DEVICES

FIELD OF THE DISCLOSURE

The present disclosure relates to systems and methods for evaluating displays of electronic devices.

DESCRIPTION OF THE BACKGROUND

There is a marketplace for reselling (used) electronic devices, such as mobile phones, tablets, laptops, GPS devices, activity tracking devices, cameras, etc. For devices sold in this marketplace, it is necessary to determine a condition and functionality of the device to be resold, to assist in grading an appropriate condition for the device (e.g. near-mint condition, new condition, good condition, well-used condition, damaged, etc.) from which an offer price to purchase the device can be established.

One resale marketplace occurs online. It will be appreciated that a potential purchaser must evaluate the condition of the target device being offered for sale remotely. While some diagnostics and test can be conducted remotely (e.g. by connecting the target device to a network and remotely accessing same for diagnostic tests), the physical condition of the device (e.g. condition of its case and display) must also be evaluated.

There are issues with current remote evaluation techniques for screens. U.S. Pat. No. 6,023,334 discloses a method and apparatus for detecting irregularities on a surface of an object, which utilizes additional equipment to evaluate the object.

There is a need to address deficiencies in the prior art.

SUMMARY OF THE DISCLOSURE

In a first aspect of an embodiment for this disclosure, a method for detecting a crack in a display of an electronic device is provided. The method comprises: locating the electronic device in front of a reflective surface; aligning the electronic device to an alignment position relative to the reflective surface; generating an image on the display through instructions executed on a processor operating on the device; capturing a reflected image shown in the reflective surface of the image with a camera; processing the reflected image to identify a line in the image through instructions executed on the processor; and determining whether the line represents a crack in the display through instructions executed on the processor.

In the method, the reflective surface may be a mirror; the image may be a white screen on the display; and the reflected image may be captured by a front-facing camera on the electronic device.

In the method, aligning the electronic device may comprise: generating an alignment pattern on the display through instructions executed on the processor; and controlling a focus of the camera by evaluating a sharpness of a reflected alignment pattern of the alignment pattern captured in the reflected image through instructions executed on the processor.

In the method, the alignment pattern may be a Quick Response (QR) code.

In the method, processing the reflected image may comprise: identifying a boundary of the display in the reflected image through instructions executed on the processor; and examining an area within the boundary for the line through instructions executed on the processor.

In the method, identifying the boundary of the display may comprise: scanning the reflected image for a set of nested contours through instructions executed on the processor; and identifying a smallest contour in the nested contours as the boundary through instructions executed on the processor.

In the method, identifying the boundary of the display may comprise applying a negative complement mask to the reflected image to determine the boundary through instructions executed on the processor.

In the method, aligning the electronic device may comprise generating a message on the display to tilt the electronic device forward relative to the reflective surface; processing the reflected image may comprise applying a negative complement mask to the reflected image.

In the method, aligning the electronic device may comprise: generating an image of a vertical line in a first section on the display; capturing a video of a reflection of the vertical line in the reflective surface; generating a video image of the reflection of the vertical line in a second section on the display located adjacent the first section; and determining when the vertical lines align with the video image of the reflection of the vertical line.

In the method, processing the reflected image may comprise applying a Hough line function to the reflected image to identify the line. In the method, parameters provided for the Hough line function may comprise at least one of: a minimum length of a line for the crack in the reflected image; a maximum distance of the line from other lines in the reflected image; and a threshold of a minimum number of intersections to be detected for the line. In the method, values for the parameters may be derived measurements from sample displays.

In the method, values for the parameters may be derived measurements from sample displays.

In the method, a first parameter value may be determined from an analysis of a graph of tracking samples of displays having cracks tracking minimum length against brightness.

In the method, the first parameter value may be from an analysis of a graph of tracking samples of displays having cracks tracking maximum gap distance against brightness.

The method may further comprise applying the Hough line function to detect multiple lines in the reflected image.

In a second aspect, a method for detecting a crack in a display of an electronic device after the electronic device has been located in front of a reflective surface and aligned to an alignment position relative to the reflective surface is provided. The method is executed by instructions executed on a processor operating on the device. The method comprises: generating an image on the display; capturing a reflected image shown in the reflective surface of the image with a camera; processing the reflected image to identify a line in the image; and determining whether the line represents a crack in the display.

In the method, processing the reflected image may comprise applying a Hough line function to the reflected image to identify the line. The method may provide parameters for the Hough line function that are derived measurements from sample displays. These parameters may comprise at least one of: a minimum length of a line for the crack in the reflected image; a maximum distance of the line from other lines in the reflected image; and a threshold of a minimum number of intersections to be detected for the line.

In another aspect, an electronic device is provided. The device comprises: a display on a front surface of the device; a camera located on the front surface; and a processor executing instructions. The instructions generate instructions on the display to assist a user of the device to locate the electronic device in front of a reflective surface; generate an alignment image on the display to assist in aligning the electronic device to an alignment position relative to the reflective surface; and determine when the electronic device is at the alignment position. When at the alignment position, the instructions then generate an image on the display; capture a reflected image shown in the reflective surface of the image with the camera; process the reflected image to identify a line in the image; and determine whether the line represents a crack in the display.

For the electronic device, in determining whether the line represents a crack in the display, the processor may executes further instructions that apply a Hough line function to the reflected image to identify the line. For those instructions, parameters provided for the Hough line function may comprise at least one of: a minimum length of a line for the crack in the reflected image; a maximum distance of the line from other lines in the reflected image; and a threshold of a minimum number of intersections to be detected for the line. A first parameter value may be determined from an analysis of a graph of tracking samples of displays having cracks tracking minimum length against brightness.

A server and/or a device may be provided to implement any aspects of the method described.

In other aspects various combinations of sets and subsets of the above aspects are provided.

BRIEF DESCRIPTION OF THE DRAWINGS

Embodiments of the disclosure will now be described, by way of example only, with reference to the accompanying drawings, in which:

FIG. 4A is a first perspective view of the electronic device of FIG. 1 being verified per aspects of the evaluation algorithm of FIG. 2 according to an embodiment;

FIG. 4B is a second perspective view of the electronic device of FIG. 1 being verified per aspects of the evaluation algorithm of FIG. 2 according to an embodiment;

DETAILED DESCRIPTION OF EMBODIMENTS

Figure 1:
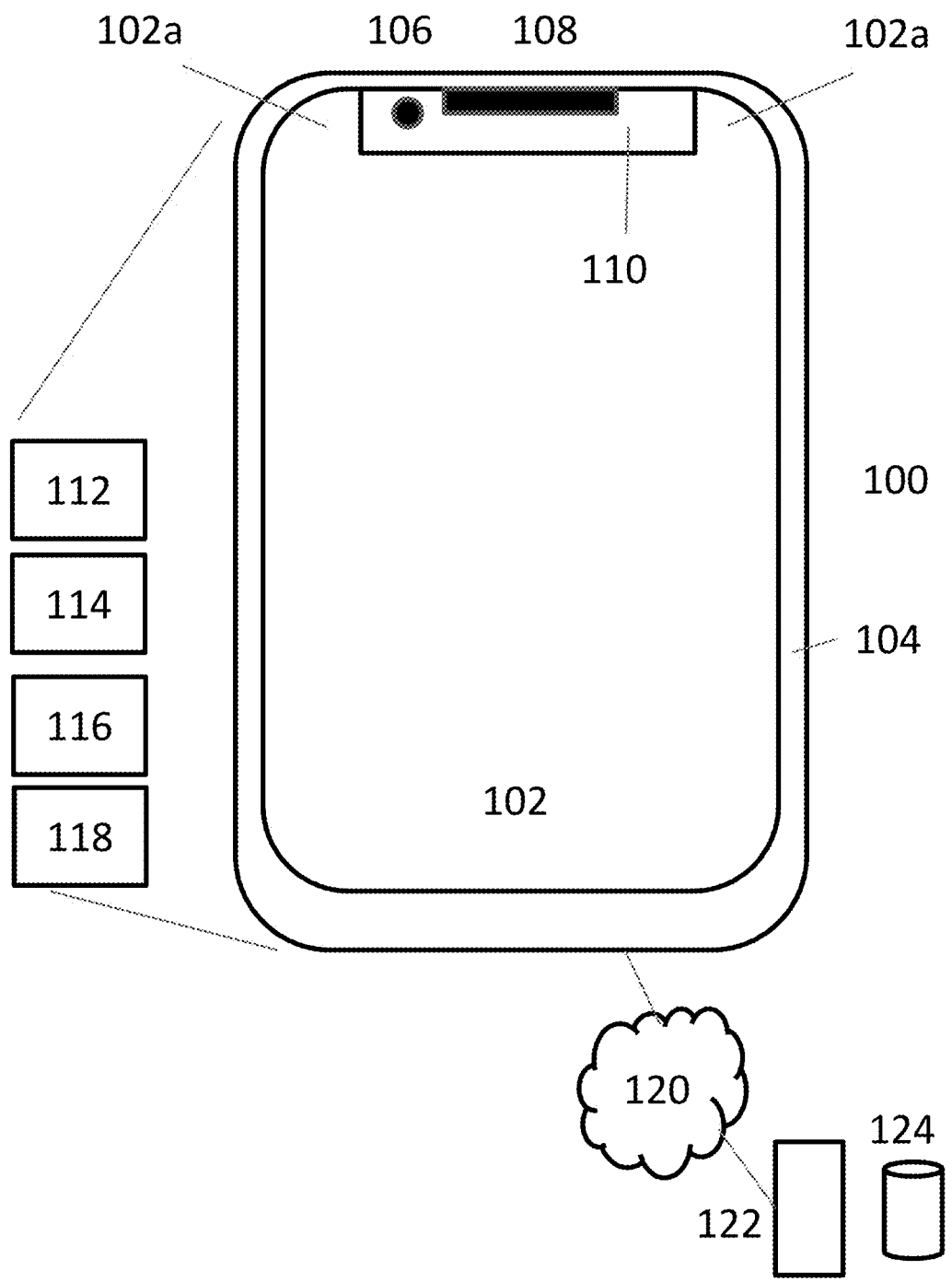
FIG. 1 is a schematic block diagram of an electronic device with its screen that is evaluated according to an embodiment.

Exemplary details of embodiments are provided herein. The description which follows and embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

Briefly, an embodiment provides systems, methods, devices and processes for evaluating screens of electronic devices, such as mobile phones, tablets, laptops, GPS devices, activity tracking devices, cameras, etc. For one embodiment, such devices have a front facing camera and possibly a gyroscope.

An aspect of an embodiment provides methods of evaluating a display/screen of an electronic device using an image of the display. The evaluation detects imperfections in the display (e.g. cracks in the screen as single cracks, hairline cracks, multiple cracks, scratches, shatters, etc.). An aspect utilizes an image (e.g. an electronic photograph) of the display, which may be captured by the device (using its onboard camera) and algorithms to evaluate the image for imperfections present in the display. For the purpose of this disclosure, the term "crack" or "cracks" will be understood to refer generically to any type of imperfection in a display that is detectable by an embodiment.

An aspect of an embodiment provides detection of various types of imperfections in a screen/display, such as detection of hairline cracks, multiple cracks, scratches and shatters in the display in real-time or near real-time with a user aligning the device in front of a reflective surface (e.g. a mirror) and then by taking an image of the device's display, as presented in the reflective surface using the front facing camera of the device. The image of the display may be analyzed to identify imperfections therein. Based on an evaluation of the identified imperfections, a grade may be assigned to the condition of the display for its imperfections (e.g. faultless, excellent, good, fair, poor, unusable, etc.).

Additional aspects of an embodiment enable processing of images of displays from different types and models of devices, where the displays of these devices have different sizes and irregular forms or features (e.g. notches in a top portion of the display, curved edges of the display on its sides, bezels surrounding a display etc.). Aspects also provide alignment and verification features to assist in capturing "best" images of the display for evaluation purposes.

The assessments may be used to attribute a monetary resale value to the device. An embodiment also provides tools and processes to track devices evaluated by processes provided herein.

First, for context, structural components of an embodiment and its features are described in view of FIG. 1. An embodiment of the disclosed system and method is depicted in electronic device 100. Within electronic device 100, there is screen/display 102 which is typically is an LED or LCD backlit device. Its form factor may extend across the entire front of device 100 or a substantial portion of it. In some devices, their displays extend the entire width of their bodies, having curved anterior edges. Bezel 104 may surround part or all of display 102. Bezel 104 may be colour matched with a colour of a case of device 100 (e.g. white) or may be black to match an unlit state of display 102. Device 100 also has front-facing camera 106 and front speaker 108. Here, the term "front-facing" refers to components of device 100 that are on the same side of display 102. A rear-facing camera (not shown) may be located on the back of device 100 (i.e. the side opposite of display 102). Some forms of device 100 place camera 106 and front speaker 108 in notch 110, which is a cut-out from a rectangular form factor for display 102. The location of notch 110 forms side areas 102a in display 102 so that the upper boundary of an active display region of display 102 is notched inwardly (e.g. an upper portion of the display of an iPhone X, trademark). Other forms of device 100 place camera 106 and speaker 110 above display 102, wherein notch 110 is not present and the display's corresponding upper boundary is straight (e.g. an upper portion of the display of an iPhone 9, trademark).

Camera 106 may be focused digitally and/or optically. For optical focus, various focal lengths and image resolutions for images captured by camera 106 may be implemented. Typical apertures for mobile phone cameras range between approximately f/1.5 and f 2.6. Typical pixel resolutions for mobile phone camera range between approximately 3 and 20+ megapixels. Images and videos captured with camera 106 may be stored in various standardized formats (e.g. JPEG, MPEG, HEIF, HEVC, etc.) or may be processed in real time, where permanent storage of such images and videos may or may not be conducted. Colour images/video are typically captured with red, green and blue channel components. A greyscale image/video has one channel component.

Within device 100, there is processor 112, memory 114, accelerometer/gyroscope 116 and communication module 118. Gyroscope 116 provides orientation and movement data associated with device 100. Device 100 may be in communication with network 120, which in turn is in communication with server 122 and database 124. Software operating on device 100 is executed by processor 112 to control images generated on display 102, camera 106 and speaker 108. Aspects of software may be provided in several modules controlling various functions of device 100 and its components. One software module controls and processes images and videos taken by camera 106 and operational parameters of camera 106 (e.g. control of focus, aperture, flash, image stabilization, image resolution (in pixels), image color depth (in bits), image/video capture rate, exposure, file format, etc.). Another software module creates graphical user interfaces (GUIs) generated on display 102 during image analysis features executed by an embodiment. of the electronic device. Another software module controls operational parameters of display 102 (e.g. control of level of backlight, brightness, contrast, colour saturation, etc.). The modules may create, store and retrieve data from memory 114 or from network 120. The modules may communicate with each other via messages and/or exchanging data and other devices in network 120. It will be appreciated that the term "software" used herein generically encompasses any machine-readable instructions executed on processor 112 (and other processors) and so terms such as "software", "software modules", "processes", "algorithms", "code", "routines" etc. are equivalent terms.

Server 122 and database 124 may process and store records associated with devices, their displays and assessments of the displays as conducted and tracked by an embodiment.

It will be appreciated that any of one or more processes, functions and algorithms of an embodiment may be executed by software on device 100 (as executed by processor 112 with software code stored in memory 114 or elsewhere) or such execution may be distributed among several devices 100 and/or servers 122. It will be appreciated that devices are clients in network 120 and that any client may have similar corresponding components and structures to comparable components described.

Exemplary devices 100 for include mobile communication devices from various companies, including Samsung, Apple, Huawei, LG, Sony, HTC, Nokia, Lenovo, BlackBerry, Xiaomi, Oppo and others. Exemplary devices from such companies include various Samsung's Galaxy models (e.g. its S series), Apple's iPhone models (e.g. models 4 through X) and others. Other exemplary devices include tablets (e.g. Samsung Galaxy Notepads, Apple iPads, etc.), notebooks, laptops and cameras. All company and device names are trademarks.

Further detail is now provided on processes, software and algorithms that capture an image of a display of an electronic device and evaluate the image to detect physical deficiencies therein (e.g. cracks in a display).

Figure 2:
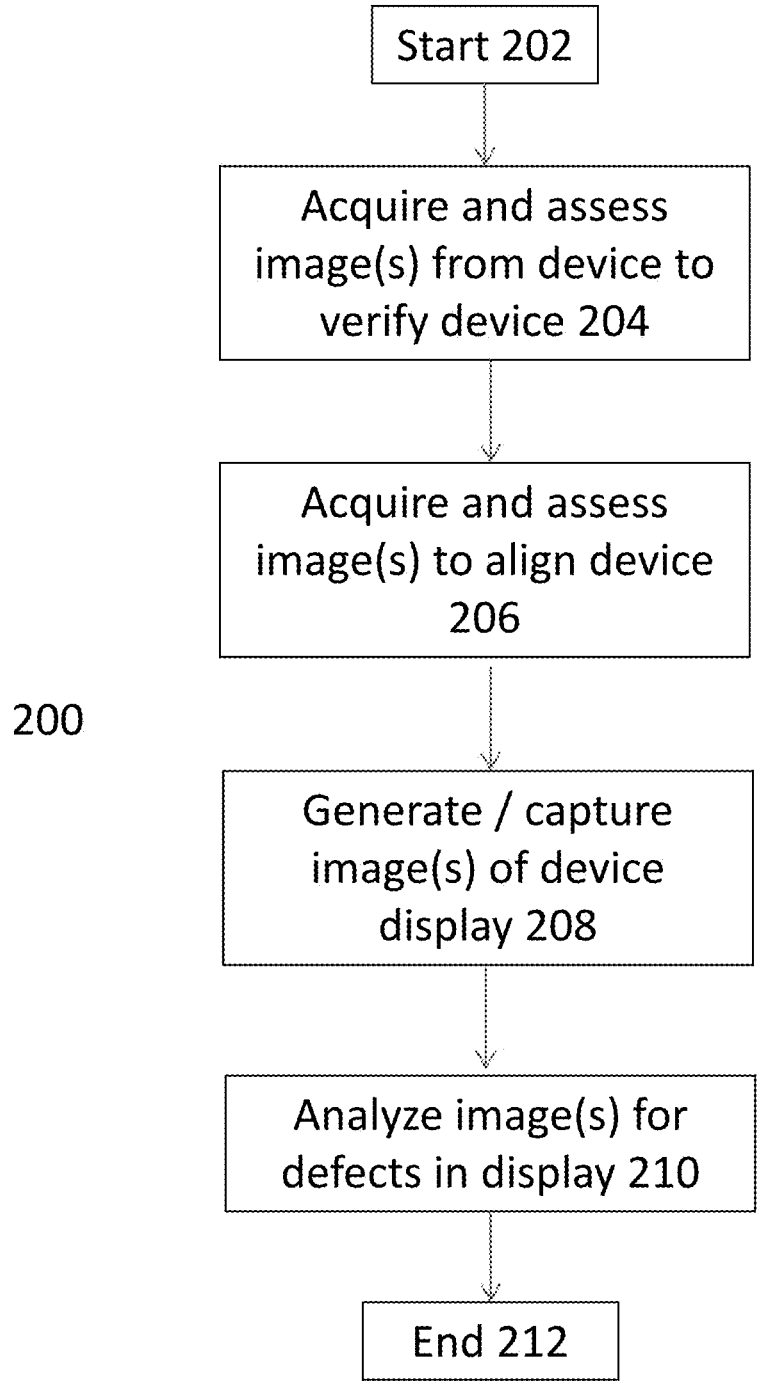
FIG. 2 is a flow chart of an evaluation algorithm executed to assess the screen of the electronic device of FIG. 1 according to an embodiment.

Referring to FIG. 2, flowchart 200 shows main processes and algorithms executed by an embodiment. For an exemplary embodiment, such processes are executed by software on device 100 (as executed by processor 112 with software code stored in memory 114 or elsewhere). However, as noted earlier, such execution may be distributed among several devices 100 and/or servers 122. High-level features of each process are introduced below, with further details on each process provided thereafter.

In flowchart 200, after software is initiated on device 100 (at process 202), process 204 is executed where device 100 is verified. Verification entails any one or more of extracting identification data about device 100 (e.g. IMEI number, serial number, mobile number, ownership records, device model information, etc.) from internal and external records and information about device 100 and any accounts associated therewith.

After process 204, process 206 is executed to align device 100 in front of a reflective surface (e.g. a mirror) to an alignment position where device 100 is located at an appropriate angle, orientation and/or distance so that images generated on display 102 produce a reflected image on the reflective surface.

The reflected image may then be captured by camera 106. Generally, it is desirable to have display 102 aligned to be parallel with the reflective surface so that when an image is generated on display 102, its reflected image shown in the reflective surface is not overly skewed or sheared from the original image generated on display 102. It will be appreciated that if display 102 is positioned to be not parallel to the reflective surface, this will produce a non-rectangular reflected image of display 102 in the reflective surface. Process 206 may determine a current alignment of device 100 in relation to the reflective surface using feedback mechanisms, such as images generated on display 102 that are captured through camera 106, orientation data provided by gyroscope 116. After determining a current alignment of device 100, images and messages may be generated on display 102 and/or audio messages may be generated through speaker 108 providing instructions to user to adjust the position of device 100 with respect to the reflective surface. This alignment loop continues in process 206, until device 100 is determined to located at an alignment position that is sufficiently aligned with the reflective surface. In alternative embodiments, other visual markers may be used having different configurations of patterns and/or texture which may be generated on display 102 and then the user may be provided with an option to select a configuration that facilitates detection from the image reflected in a mirror (via messages generated on display 102).

After process 206 determines that device 100 is sufficiently aligned with the reflective surface, process 208 is executed where one or more images are generated on display 102 with one or more audio messages generated through speaker 108. These image(s) produced on display 102 are reflected in the reflective surface as reflected image(s) and the reflected image(s) are then captured through camera 106. The image(s) are meant to activate as much of display 102 as possible (e.g. a fully-on "white" screen), so that imperfections in display 102 become more visible, thereby assisting with identification of same. Camera 106 may take a still image or a video of the reflected Image(s). Data that may be associated with the image includes a timestamp and identification data for device 100.

After process 208 captures reflected image(s), process 210 is executed where the data of the reflected image(s) are processed and analyzed to identify imperfections in display 102. It will be appreciated that the reflected image as captured by camera 106 is used as a facsimile of the actual image generated on display 102. As such, a defect identified at a location in the captured reflected image generated on display 102 represents a corresponding defect in the corresponding reflected location in display 102. As part of analyzing the reflected image(s) some image processing is conducted to identify boundaries of display 102 as represented in the captured image(s). Such boundaries may include identifying whether there is bezel 104 or notch 110 in part of the captured image(s) and if so, to exclude sections with bezel 104 or notch 110 from image processing. Once boundaries for display 102 have been identified in the captured reflected image(s), an effective display image has been identified. The effective display image is then processed through one or more image processing algorithms to identify different types of screen defects and cracks that may be present in display 102.

Further detail is now provided on processes of software illustrated in flowchart 200 (FIG. 2).

Figure 3A:
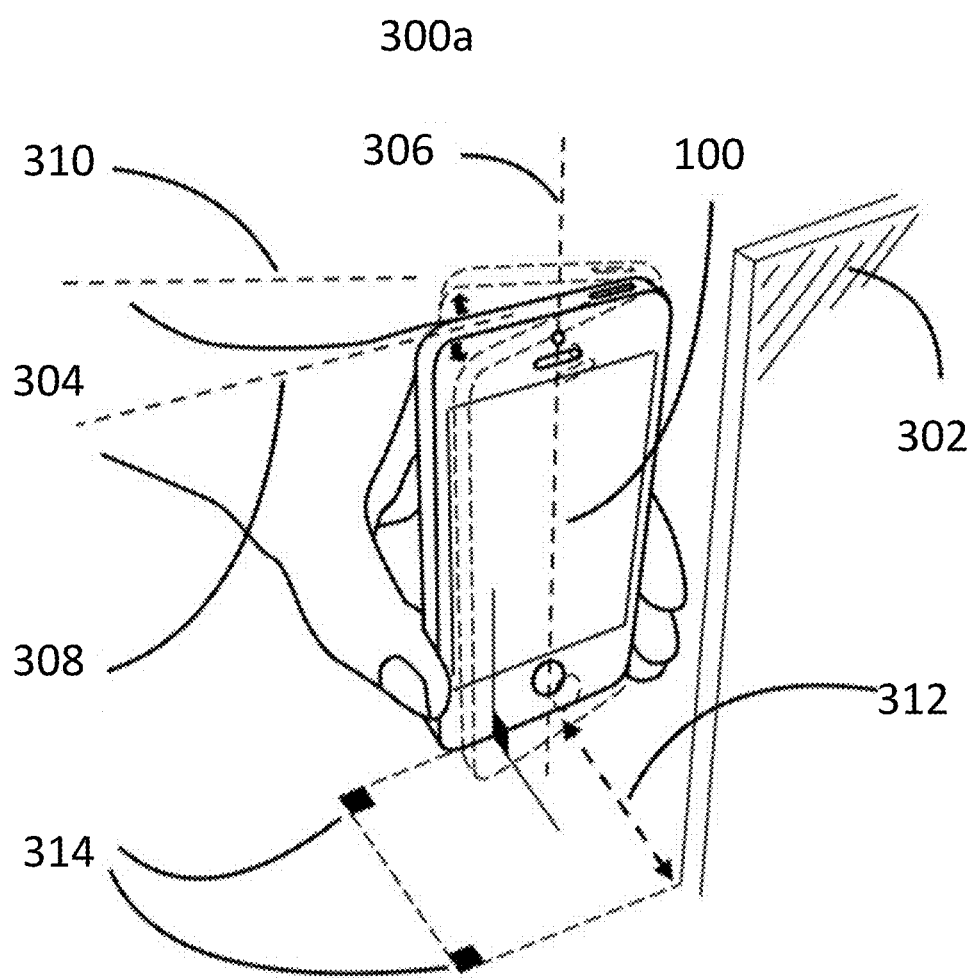
FIG. 3A is a first perspective view of the electronic device of FIG. 1 having its screen being evaluated per aspects of the evaluation algorithm of FIG. 2 according to an embodiment.
Figure 3B:
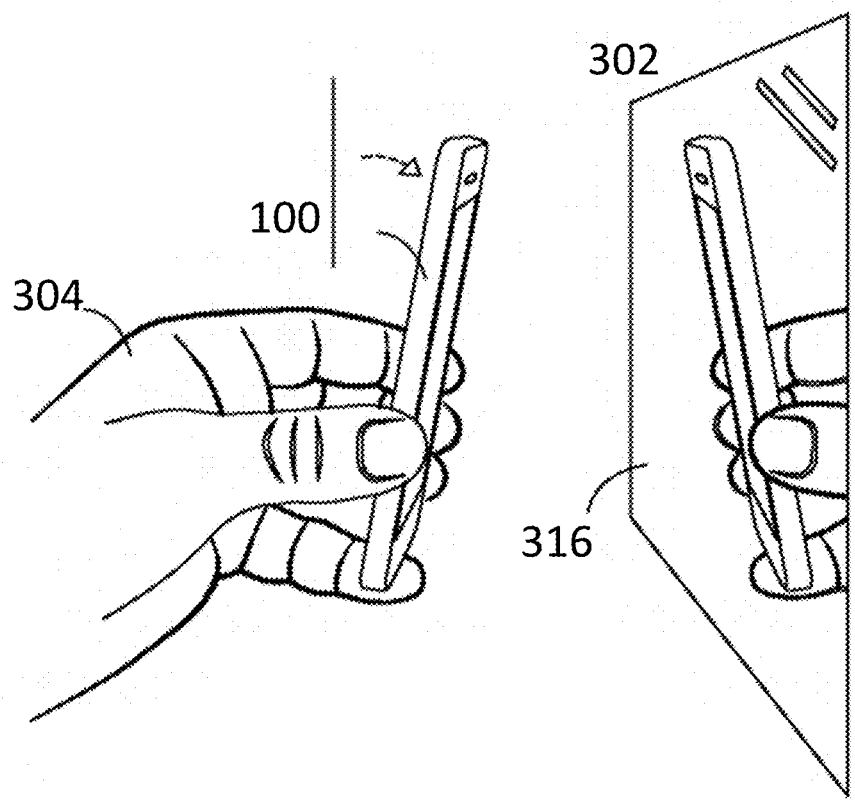
FIG. 3B is a second perspective view of the electronic device of FIG. 1 having its screen being evaluated per aspects of the evaluation algorithm of FIG. 2 according to an embodiment.

First, referring to FIGS. 3A-3C and FIG. 5, further detail is provided collectively on alignment process 206 (FIG. 2) in environments 300a, 300b, 300c(i), and 300c(ii). Briefly, FIG. 3A illustrates an exemplary alignment process for device 100 where images in mirror 302 of reflected screens generated on display 102 may be captured by camera 106 as device 100 is positioned at different angular positions about axis 306. In such a process, visual alignment targets may not be generated on display 102. FIG. 3B illustrates a second alignment process that may be executed on device 100, where the top end of device 100 is tilted forward towards mirror 302 so that the lower part of device 100 and display 102 appears fully in a reflection in mirror 302. As such the image of display 102 captured by camera 106 includes the entire length of display 102.

User 304 (FIG. 3A) holding device 100 should locate device 100 in an orientation and distance from mirror 302 to execute device verification algorithms in process 204. As part of verification process 204, audio and visual instructions are generated on device 100 to provide alignment instructions for user 304 to follow. For example, audio-visual commands may be generated though through speaker 108 with text and graphics (still or moving) generated on display 102. Text for messages may be generated to appear in normal orientation (as read directly from display 102) or in a reverse (mirrored) orientation (as read as a reflected image in mirror 302).

Next, as part of alignment process 206, device 100 should be aligned in an upright position and in a parallel orientation 314 with display 102 facing the reflective surface of mirror 302. As such, images generated on display 102 appear in mirror 302 in reverse. This reverse image in mirror 302 may be captured by camera 106.

Part of the images are graphical alignment patterns generated on display 102 facilitate identification and alignment of device 100 relative to mirror 302. Alignment patterns that have consistent and high contrasting sections (e.g. black and white sections), such as vertical and horizontal lines and regular shapes and targets, are helpful in identification and alignment. One embodiment generates a matrix barcode image, such as a Quick Response (QR) code, on display 102 as an alignment pattern. A QR code may incorporate authentication data for device 100 within its coded pattern. Graphical pattern 406 (FIG. 4A) illustrates one exemplary code generated on display 102. The contrasting squares of black and white in a QR code facilitate QR code recognition by QR code reading software. As well, contrasting elements in a QR code facilitate focusing of images of display 102, which, in turn, facilitates screen area determination for display 102 using stored coordinates of QR code.

As part of alignment process 206, images/video captured by camera 106 of the reflected image presented in mirror 302 may be tracked in part using QR code reading software. Alignment and focus of the captured image(s) are used to adjust focus and aperture parameters of camera 106 by camera adjustment software operating on device 100. Audio-visual messages 402 (FIG. 4A) are generated on display 102 and through speaker 108 providing audio and visual instructions to user 304 to align device 100 be sufficiently close to mirror 302. Images captured by camera In one configuration, instructions are provided to align device 100 to be approximately 4 to 6 inches (approximately 10.6 cm to 15.2 cm) from mirror 302 as an initial distance 312 from mirror 302. Instructions are then provided for user 204 to slowly increase or decrease distance 312 of device 100 from mirror 302. As device 100 is moved towards and away from mirror 302, camera 106 captures images/video of graphical pattern 406 that appear in mirror 302. Process 206 analyzes the captured images, makes focus adjustments to camera 106 and determines a current distance 312 of device 100 from mirror 302. When device 100 is determined to be at an acceptable distance 312 from mirror 302, messages 402 are generated to instruct user 304 to stop moving device 100 and keep it steadily positioned at its current orientation and location with respect to mirror 302. An appropriate distance may be approximately 5 inches (12.7 cm) from mirror 302.

Per FIG. 3B, once device 100 is located at an acceptable distance from mirror 302 (showing reflection 316 of device 100) and device 100 is stabilized at that location, process 206 then may attempt to have device 100 adjust one or more of a pitch (about its y-axis), yaw (about its z-axis) and/or roll (about its x-axis) of device 100 at its current location relative to mirror 302. Process 206 may utilize data from gyroscope 116 to determine a current vertical angle (pitch) of device 100 relative to mirror 302 and generates audio-visual feedback messages on device 100 to user 304, informing whether device 100 is aligned upright to mirror 302 within an acceptable range of angles. To control user's adjustment of a pitch angle of device 100, process 206 generates audio-visual instructions to slowly tilt top end of device 100 forwards or backwards (while at the same location), until an acceptable vertical angle is reached between device 100 and mirror 302. At that time, an audio-visual feedback message may be generated indicating that an acceptable vertical angle for device 100 is currently set and that device 100 should be held in place.

Figure 3C:
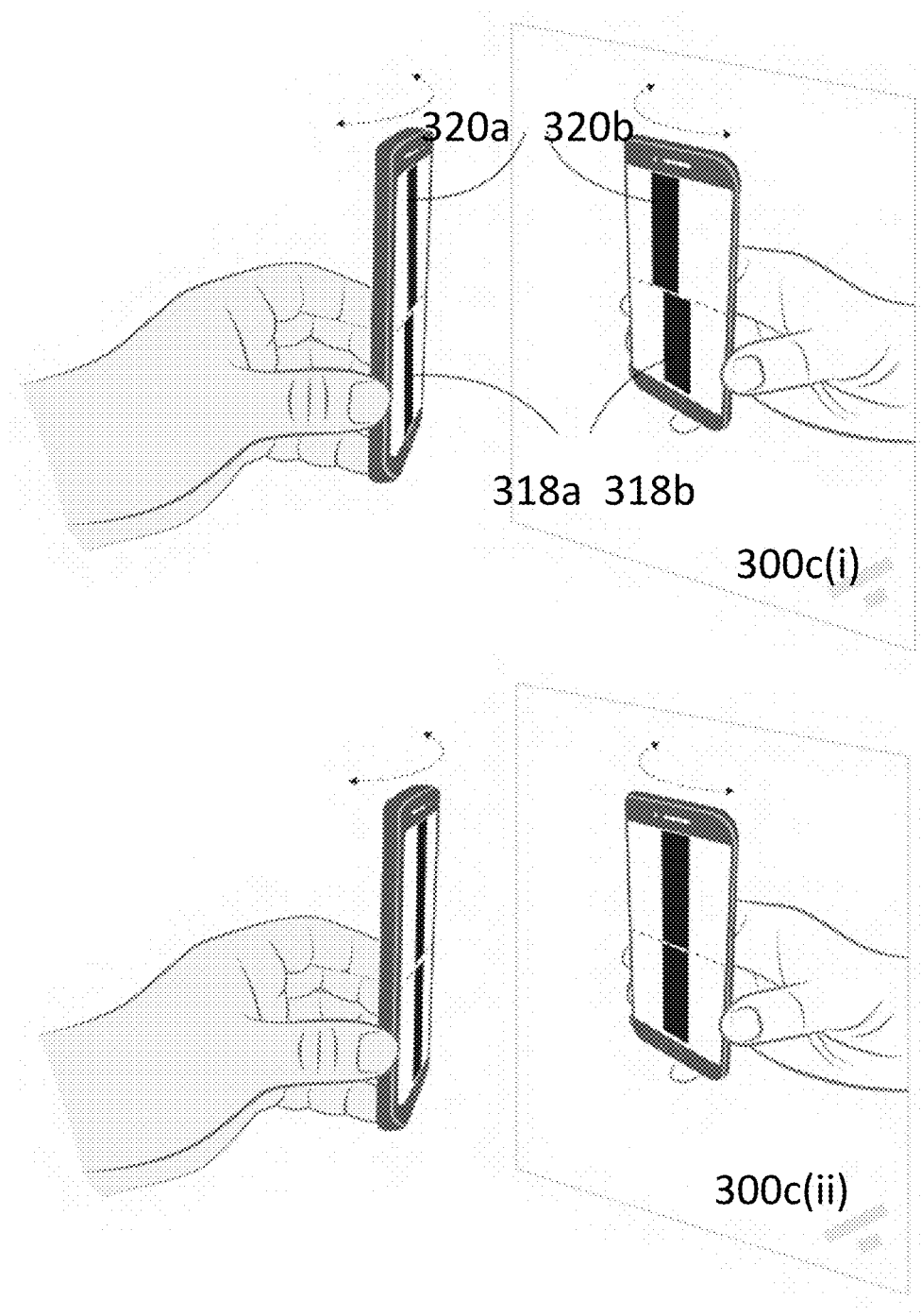
FIG. 3C shows two perspective views of the electronic device of FIG. 1 having its screen being evaluated with an alignment tool per aspects of the evaluation algorithm of FIG. 2 according to an embodiment.
Figure 5A:
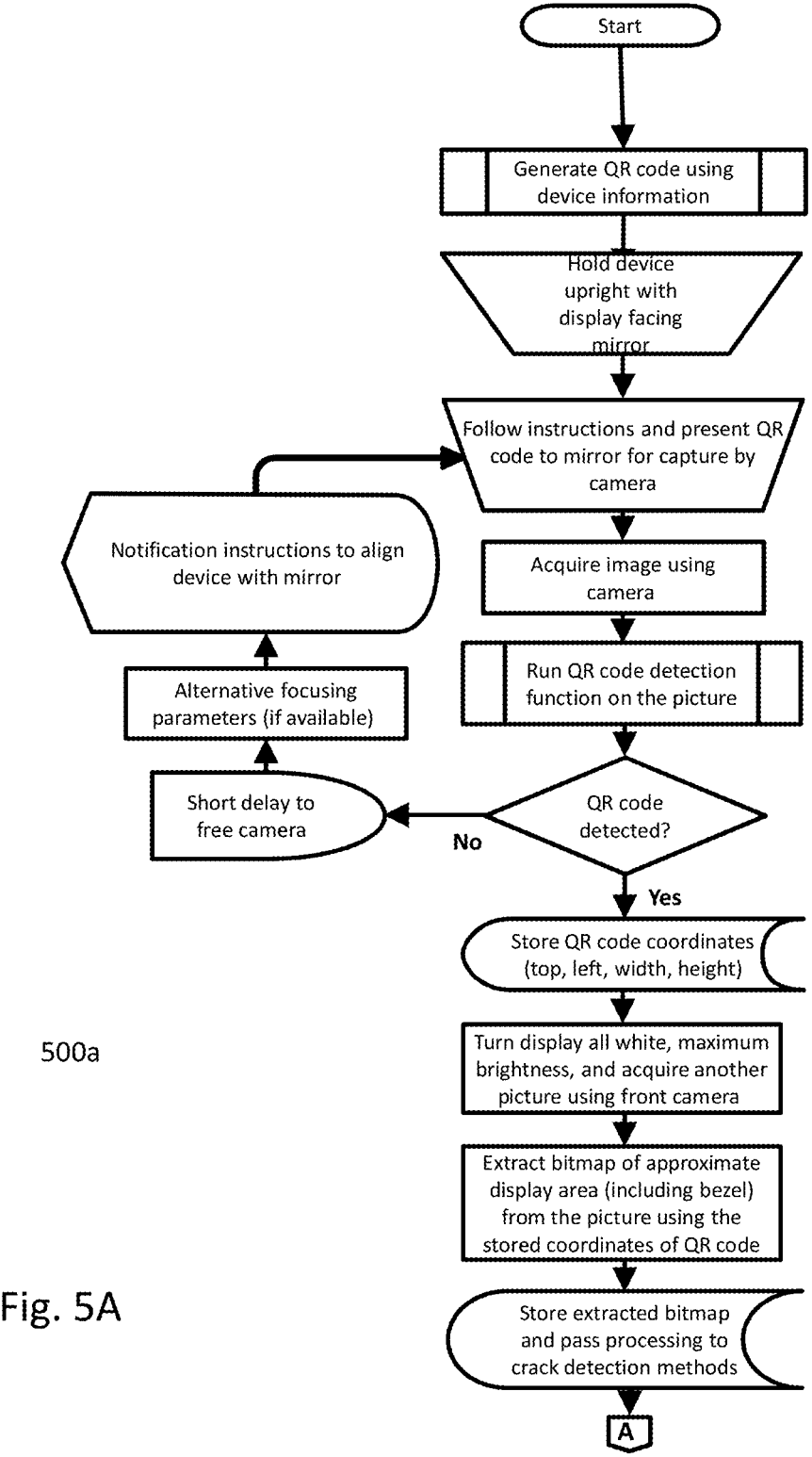
FIGS. 5A-5D collectively are parts of a flow chart showing crack detection authentication, device alignment, image capture and image processing processes executed on the electronic device of FIG. 1 according to an embodiment.
Figure 5B:
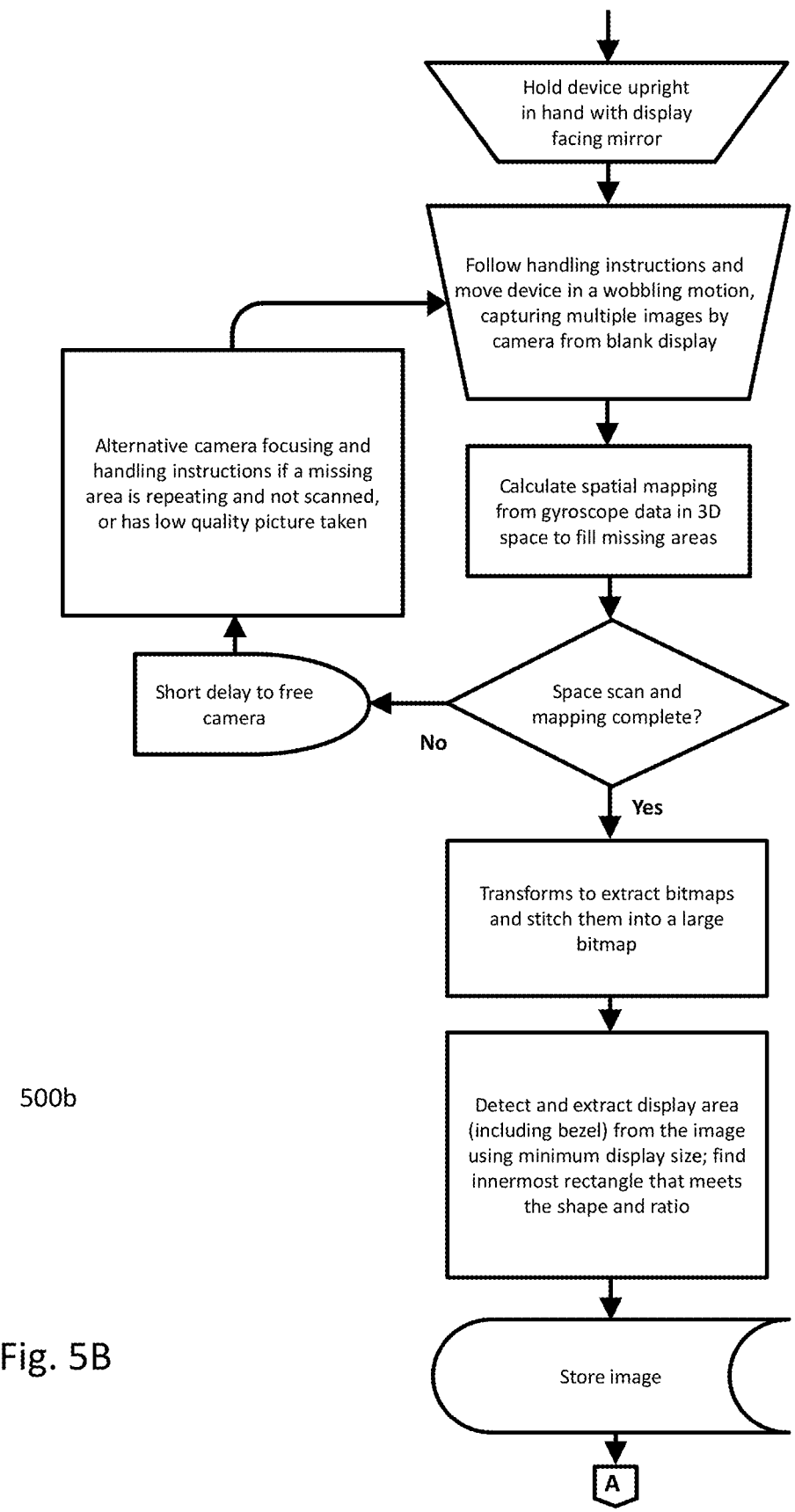
Figure 5C:
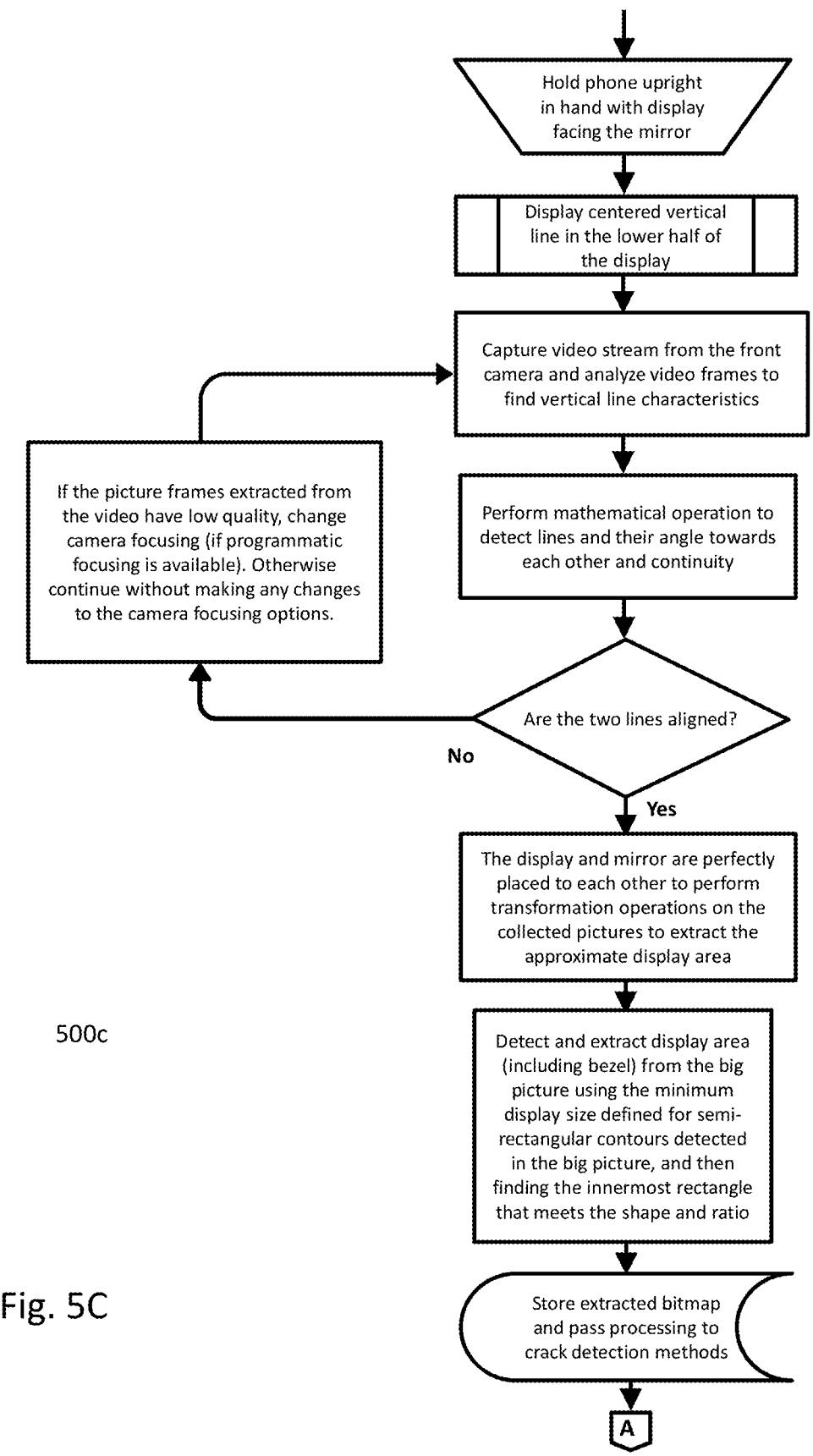
Figure 5D:
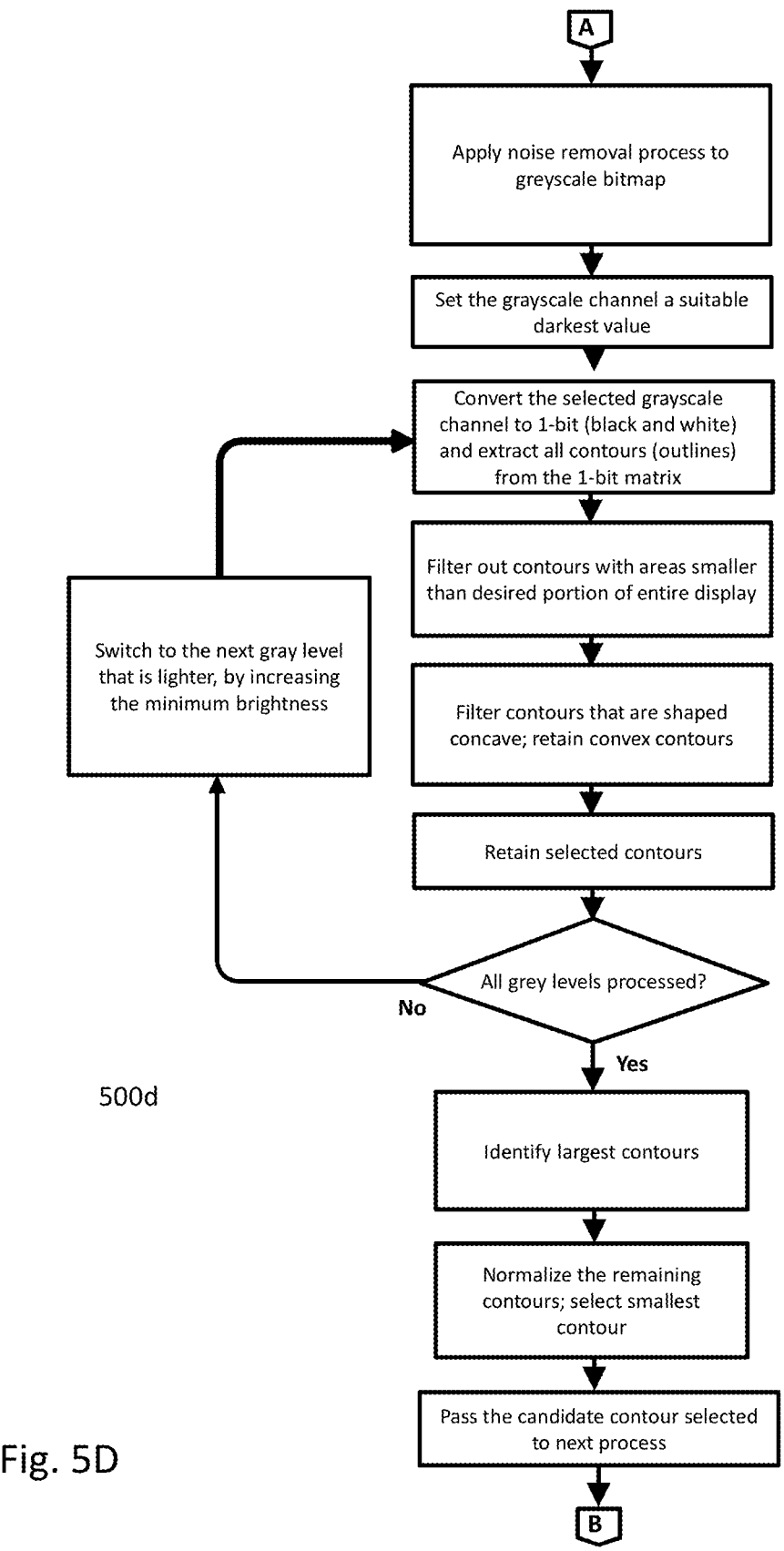
Figure 6A:
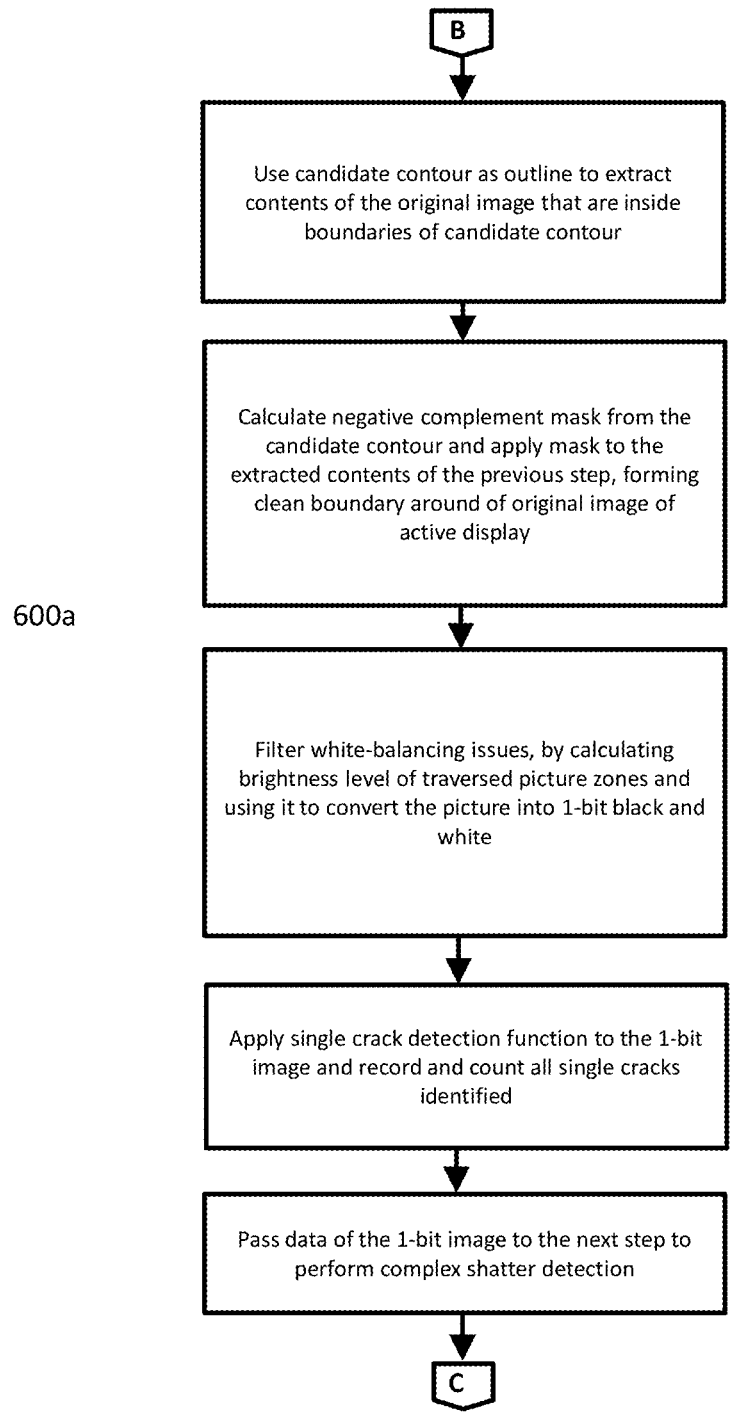
FIGS. 6A-6B collectively are parts of a flow chart showing crack detection processes executed on the electronic device of FIG. 1 according to an embodiment.
Figure 6B:
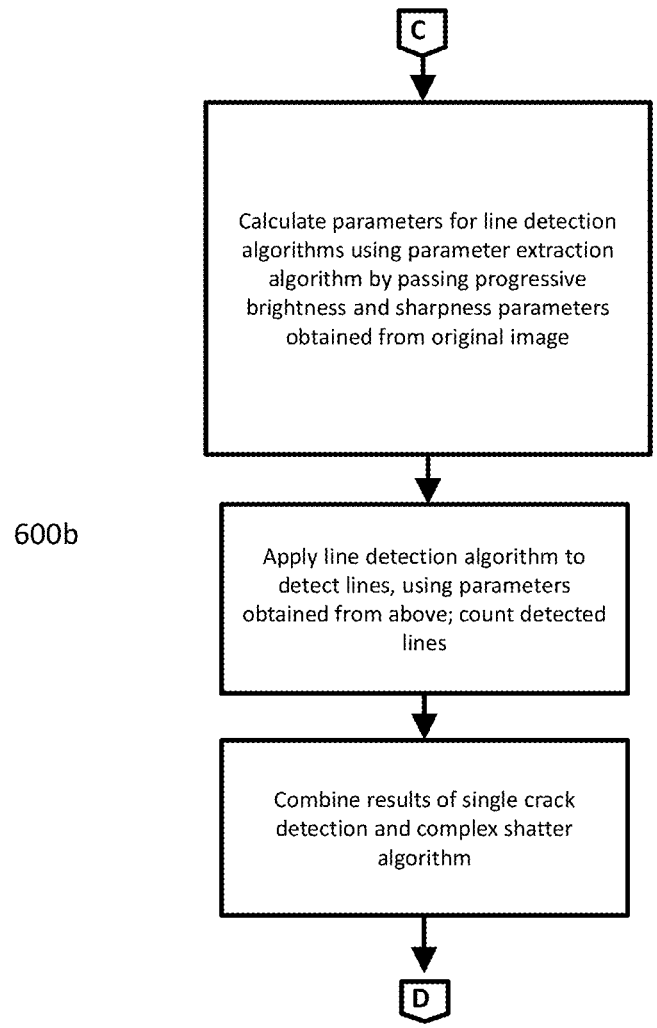

Referring to FIG. 3C, a first alternative to alignment process 206 is as follows. The first alternative utilizes static alignment image(s) 318*a* generated on display 102 in a first portion of display 102. Device 100 is placed before mirror 302, thereby creating reflection 300*c*(i) showing reflected alignment image(s) 318*b*. As shown, alignment images 318 are primarily vertical lines. Other alignment images may comprise horizontal lines, concentric "target" circles, etc. or other physical features that may be visually aligned with other features.

Per FIG. 3C, image 318*a* is a static black vertical line on a white background having a thickness between approximately 10% and 40% of the width of display 102 and having a height of approximately 25% to 75% of the height of display 102 (measured in its middle). One form of vertical line has a width of approximately 20% and height of approximately 50% of display 102. Camera 106 captures video of reflected image portion 300*c*(i) and device 100 reproduces a cropped lower half of the screen area portion of reflection as image 320*a* in a second portion of display 102. Here, display 102 is divided into lower and upper sections 318*a* and 320*a*. User 302 is provided with audio visual messages on device 100 to align device 100 in a position that images 318*a* and 320*a* (and corresponding reflections 318*b* and 320*b* as captured by camera 106) become aligned in a straight (vertical) line, thereby setting an optimal position for device 100 about mirror 302. Processes may be executed to determine when continuity in the lines (i.e. when two lines touch) is achieved.

Exemplary algorithms and processes count the number of outlines (contours) in an image and shapes of outlines of touched lines and determine whether the shapes create a larger rectangle (or trapezoid) with four relatively flat sides. The results determine alignment and continuity of the two lines. In various embodiments, processes may employ features of a scanning, sweep line algorithm to determine a degree of intersection of the lines.

Alignment of fixed vertical lines to the real-time images is determined by movement of device 100 about its y-axis. For other alignment features, other directional movements and alignments are correlated to the alignment features. For example, for horizontal lines, movement of device 100 may be along its x-axis and images 318*a*(ii) and 320*a*(ii) (not shown) may be generated beside each other.

Once device 100 is determined to be positioned and aligned appropriately before mirror 302, images can then be generated on display 102 for evaluating display 102 for defects. One evaluation image is to generate a fully white screen on display 102. Images/video of the reflected image in mirror 302 are captured with camera 106 and are combined with data from gyroscope 116. Multiple images may be displayed and captured. If data extracted from a video does not have sufficient quality (e.g. it is out of focus), focus, exposure and other parameters of camera 106 may be adjusted manually or through process 206.

In one embodiment, re-alignment and re-positioning of device 100 in front of mirror 302 is not performed, as it is assumed that device 100 is being held in its aligned place. However, process 206 may be re-executed as needed after image processing process 208 has initiated if re-alignment is desired.

Referring to FIG. 4B, a second alternative to alignment process 206 is as follows. The second alternative utilizes a combination of capturing video of device 100 being moved in a movement pattern about various axes/orientations (e.g. about any of its x, y, and z axes or its comparable roll, pitch, yaw orientations) at its location in front of mirror 302 and correlating captured images from the video with orientation data for device 100 (e.g. as provided by gyroscope 116). One exemplary movement pattern comprises tilting device 100 about its y-axis 306 (yaw) in a circular orbit fashion 404, keeping display 102 facing mirror 302 as device 100 is moving. The process captures several images of a reflected image of pattern 406 generated on display 102 and links each image with contemporaneous gyroscope data. A composite image is generated that stitches together individual images using in part alignment data for an image mapped to a three dimensional space. The composite image may have missing images in its space filled with interpolated images, creating a composite spatial map of images captured. The composite image contains details of the assembled images with alignment data which can be evaluated for defects.

When the images are analyzed in process 210, the image, gyroscope data, orientation angles of the image with respect to mirror 302 are determined and this data is analyzed with the image to identify defects in display 102.

For processing and capturing images by camera 106, alternative manual and automatic focusing systems may be used while displaying complex patterns. Alternative alignment processes may be initiated to have user realign device 100 under certain conditions, for example if a missing area is detected or if an image has low quality.

Further image processing detects and extracts a screen area (including bezel) from composite image. One process uses a minimum screen size defined for semi-rectangular contours detected in the composite image, and then determines an innermost rectangle that meets a shape and ratio for display 102.

Device 100 may have a display or bezel that requires additional processing to determine an effective active area for its display 102. For example, display 102 may extend the width of device 100 with curves on its lateral sides; or display 102 may have a coloured bezel that is different from the border of its display (namely, in an area before the active area of the display starts).

For an embodiment, an edge detection process for the captured image identifies in a scan of the image multiple contours around an active screen area for the display. The contours typically are identified as a set of concentric rectangles, nested within each other. The covered areas of these contours are typically relatively larger than other contours (which typically outline noise or actual cracks in display 102 for an embodiment). The process typically selects the smallest nested rectangle as defining an effective area for display 102.

Now, referring to FIGS. 4A-4B, FIG. 5 and FIGS. 6A-6D, further detail is provided on image(s) capture process 208 (FIG. 2). Process 208 has three main aspects: generating and capturing an image of display 102; processing the captured image to identify boundaries for a usable display area for display 102; and evaluating the usable display area for display 102 for defects.

For the first aspect, process 208 generates a blank screen for display 102 with white background. An image is captured of the blank screen.

For the second aspect, a rectangular area for display is identified. It will be appreciated that the captured image may include additional boundary items for device 100 and its environment (for example, bezel 104; notch 110, if any; user's fingers holding edge of device 100, etc.). One image evaluation process identifies a main rectangular area in the image. Image markers may be used to define rectangular boundaries, such as with QR codes. The QR codes may be generated several instances, including when verifying an authenticity of device 100 and during defect detection (namely, before a white screen is presented on display 102) to assist with focusing camera 106 on display 102 by providing a contrasting, complex patterns as targets for focusing.

Process 208 will then adjust image size to remove extraneous elements that may be in the periphery of the image (e.g. bezel 104), thereby identifying a core active, pixel bearing area of display 102 in the image. It will be appreciated that bitmap data of an active screen area of display 102 has been captured an image/video. However, additional extraction transforms may be applied to the image to enhance boundaries between the active screen area of display 102 and bezel 104.

Process 208 typically analyzes a converted greyscale image of the captured colour image. An original (colour) image may be converted to a greyscale image using a greyscale averaging algorithm, a desaturation algorithm, a decomposition algorithm, or other comparable algorithm(s).

When the converted greyscale image is created, noise removal transforms are applied to transform an image from a complex noisy picture to a simpler, smoother and less noisy image. The transforms are applied over levels of grey of the greyscale image, in a loop that processes filtered images using incremental brightness filters. The greyscales assist in separating objects captured in the image that have different intensities of light (e.g. borders of display 102, defects, dust, and clean non-defective areas in display 102). For example, for a greyscale range of 0 to 255 (0 being fully dark and 255 being fully white): areas of an image that are darker than a grey value of approximately 50, may be too dark to process; areas having a grey value of between approximately 50 and 100 be bright enough to have defects appear as with darker values than non-defective areas.

An embodiment may deploy various noise reduction algorithms. Noise reduction algorithm have different precision and performance parameters. For one embodiment, a selected noise reduction algorithm is a faster, less precise process, as it has been determined that since the analysis is based primarily on a larger, simple region (namely a white display 102), it is acceptable to have less precise details of cracks identified in an image (e.g. a less precise determination of its location and size is acceptable). After coordinates of the display are determined, the display area is extracted from the source image and a more precise noise removal method may be performed on the display area. This noise removal process should preserve data associated with cracks appearing in the active screen area.

As a first loop, a greyscale channel for the greyscale image to a sufficiently dark value. On an 8 bit greyscale level (0=fully black, 255=fully white), an initial greyscale value of approximately "50" may be applied.

For that image at that value, its greyscale channel is converted to a 1-bit value (i.e. either black or white). Next, contours (namely shape outlines) that are detected in the converted image are extracted from the corresponding 1-bit matrix. A contour is an outline or boundary of an element in the image defined by a notable change in brightness in the image (for example a region of darker pixels, which may be black or sufficiently dark, detected in a region of lighter pixels, which may be white or sufficiently light, where the region is identified as a discontinuity in that portion of the image). More particularly, a contour is a closed outline of a shape having a perimeter that creates closed edges that are traceable to a point of origin for the trace. An analogy is that a contour is created from a line drawn on paper that changes direction several times and ends up at its point of origin. Each time the direction of the line changes in a significant manner, the path of the trace behind may be considered to be a straight line representing a side of the shape, and the change in direction represents a connected side for that shape. Before getting back to the point of origin, the trace will define three or more sides. An embodiment may use an edge detection algorithm, such as Canny, Sobel, Laplacian of Gaussian, Prewitt, etc., to determine and identify contours in the processed image.

Next, to complete the processing loop, the processed image further filters the identified contours. Filtering is conducted using smaller areas of the greyscale image. One embodiment sets a smaller area as being smaller than approximately 15% of the entire screen area. This filtering removes small data areas, large noise areas, light reflections and glare.

In process 208, contours in the processed image that are concave are removed, while convex contours are retained. The removal parameters may accept and retain a contour that has a minor cavity in one of its sides. Other removal parameters may be set. From the processed image, contours that have four sides are retained, representing display 102 with its four sides.

For the filtered image, the loop is repeated at incrementally lighter grey levels. For example, a second loop would increasing the minimum brightness by an increment of 50. For an 8 bit greyscale image filtering loops may be conducted at converted greyscale images at greyscale levels 50, 100, 150, 200, 250, etc. It will be appreciated that granularity and steps of the loops may be varied.

Next, process 208 identifies the largest contours in the image that have an area that is above a threshold as being larger than other contours found in all grey levels. One process uses an threshold of at least 80%. Next, all remaining contours are normalized and finally, the smallest contour of the largest contours is select. This contour contains the dimensions for the active area for display 102 which can be used for the crack analysis. Depending on the parameters of the contours, for display 100 having notch 110, a side of the contour representing the upper portion of display 102 may have a slight dip in it, representing notch 110.

Additional adjustments may be made to the processed image to address a skewing angle in the image caused when device 100 is not held parallel to mirror 302, causing the captured image of display 102 to not be in a regular rectangle form.

Such a deviation from an ideal rectangle may trigger a false-positive for defect detection analysis. An image of an non-ideal rectangle, may produce non-existing data on borders for display 102 that may be incorrectly identified as defects in the processed image. To address same, process 208 may apply a negative complement mask algorithm to the image to create a mask-adjusted image, which produces a processed image of display 102 having a rectangular area. The mask-adjusted image is merged into the original skewed bitmap, forming an adjusted image having a rectangular boundary.

Next, one or more image processes are applied to the adjusted image to attempt to highlight imperfections captured.

For example a colour-depth transform may be applied to convert the image to a one bit black and white image. This may be accomplished by decreasing the color depth of the adjusted image to calculate an adaptive level for the adjusted image by converting the adjusted colour image to a greyscale image (e.g. with an 8-bit depth) and progressively calculating an average brightness of smaller areas of the image until the entire image is processed. This is one of the parameters needed by the primary crack detection process 210 to calculate a secondary set of parameters for its line detection functions.

As well, the adjusted image may be processed through noise removal transform(s) to detect and filter noise from the adjusted image. This process removes artefacts from the image (e.g. artefacts that are not cracks in display 102). This transform may be applied to the black and white image produced by the colour-depth transform and removes minimal noise items that are deemed to be clearly not cracks.

It will be seen that this transform provides a filter that removes items that have been determined to not be a crack in display 102. For an embodiment one mathematical definition for a single crack is evident when the number of black pixels inside a bounding rectangle around the contour does not correlate with the ratio of longer edge to the shorter edge of the rectangle. In other words, the longer, narrower bounding rectangles around cracks should have more of their areas covered with black pixels caused by the crack, and the shorter, more squarish rectangles should have a much smaller area covered in black pixels of the crack.

If the bounding rectangle is determine to have dimensions more like a square while yet has most of its area in black, it may be considered to be noise, as this has a round footprint when converted to 1-bit black and white image and typically single cracks do not appear circular. The noise then can be filtered by eliminating contours that have a ratio larger than a set number, which may be computed and optimized.

Once device 100 is aligned in positioning within acceptable parameters to mirror 302, process 208 begins generating images on display 102 and correspondingly captures images as seen by camera 106 as reflected images as seen in mirror 302. Static images and videos may be generated on display 102 in process 208. An image with a specific pattern generated on display 102 will have various parameters associated with the image, such as colour palette, brightness, contrasts, intensities, etc. Variations for the pattern may be generated that change one or more of those parameters. As variations are generated, camera 106 captures corresponding reflected patterns in mirror 302. Cycles of generating variations and capturing reflected images may be repeated several times at various frequencies (e.g. several samples per second) when a variation on the pattern is generated on display 102.

Additional images may be generated capturing a given image captured at different angles from an initial position (where device 100 is parallel to mirror 302). As an alternative for process 208, an additional image is generated on display 102 and process 208 generates audio-visual messages 402 instructing user 304 to rotate device 100 about its vertical axis 306 while still positioned parallel to mirror 302. This rotation changes a yaw position of device 100 about its vertical axis 306, producing a series of new angles 310 from being parallel with mirror 302. Messages 402 will appear in reverse orientation on display 102 to appear correctly in mirror 302. In other embodiments, a first form of an image (e.g. a vertical rectangle or square) is generated on display 102 that changes into a second form (e.g. a trapezoid) as device 100 is rotated. These images and transformations are captured by camera 106. Such images may be combined with QR codes (as a low resolution, large-celled format) to locate corners of display 102 when device alignment is performed.

As device 100 is rotated about its vertical axis 206 and images are captured, process 208 accesses data readings from gyroscope 116, to determine angular data on positions of device 100. These rotated images may continue to be captured until a sufficient number of images and data points are collected. The rotation may span an arc about axis 306 wide enough to capture enough images to satisfy a statistical or precision threshold for the process (e.g. over 45 degrees relative to mirror 302). Depending on the precision required, the rotation and capture process may be repeated multiple times.

Again, a negative complement mask filter may be applied to a candidate contour of the processed image, to identify a boundary around the edge of display 102.

Next, the captured image may be filtered to adjust for white-balancing issues caused various factors, such as an acute angle at which display 102 is presented to mirror 302 inconsistent backlighting, etc. It will be appreciated that in when device 100 is oriented at a certain angle to mirror 302 in a particular backlight condition for display 102, a captured image of display 102 may show a non-defective part of display 102 to be darker than the areas with actual defects/cracks. A white-balance filter progressively calculates a brightness level of an active area in the processed image and converts the masked image into a single bit black and white image. An adaptive threshold may be used.

Next, aspects of the processed image may be sharpened to enhance boundaries of a line of a contour. Therein, a sharpness level for an image is calculated by converting an area in the image surrounding each contour from its current 8-bit greyscale into respective 1-bit black and white image. Next a shrink rate is calculated for contours between the greyscale image and the black and white image. The image having a smaller shrink rate is selected as the sharper image.

Figure 7:
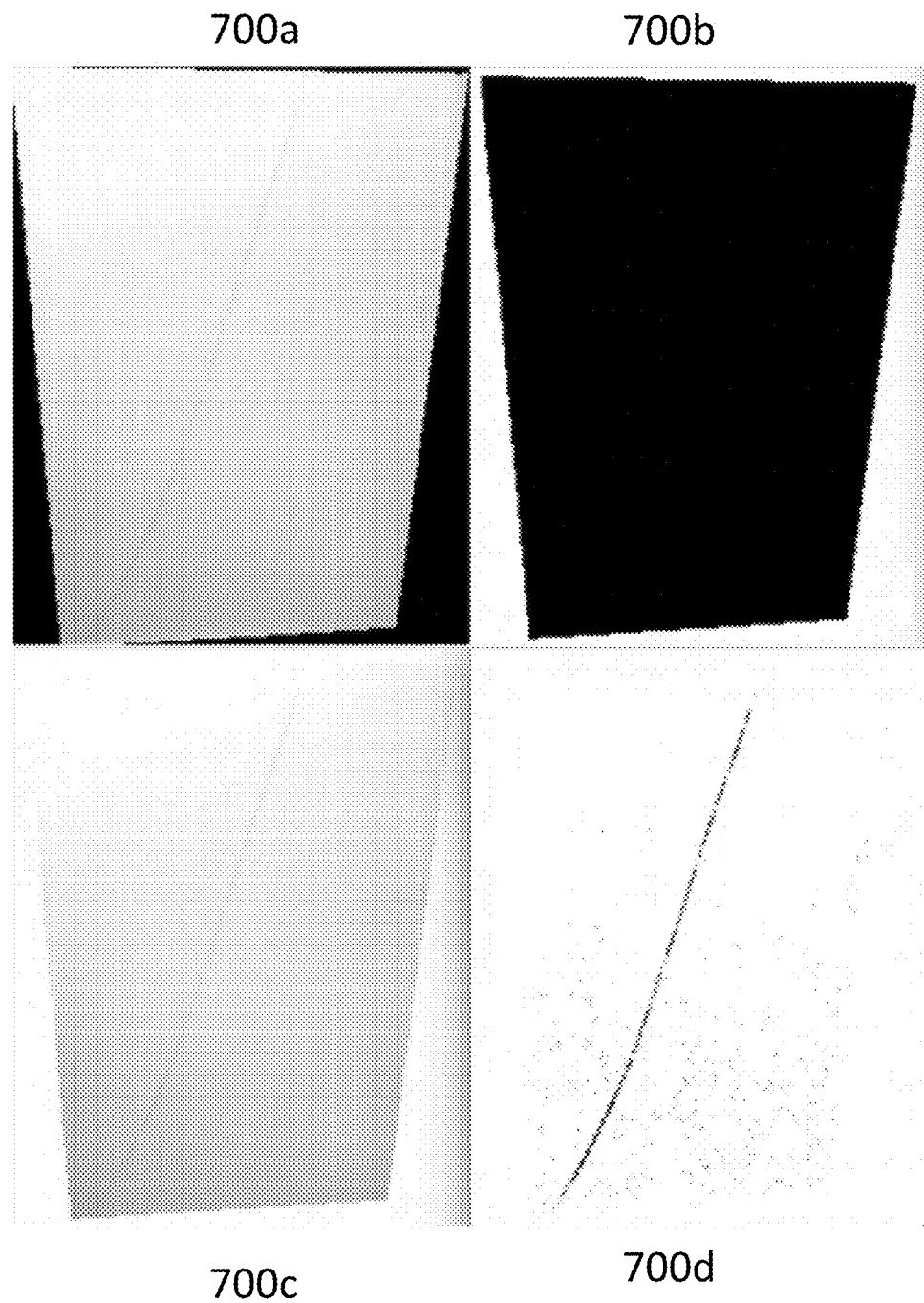
FIG. 7 is a collection of images of captured screens processed by image capturing processes by aspects of the image processing process of FIGS. 5A-5D according to an embodiment.

FIG. 7 shows several display images after various processing states, namely: extracted active screen image 700*a*; negative complement mask processed image 700*b*; merged result 700*c* of images 700*a* and 700*b*; and clean image 700*d* resulting from application of adaptive brightness correction and noise removal processes.

Figure 8:
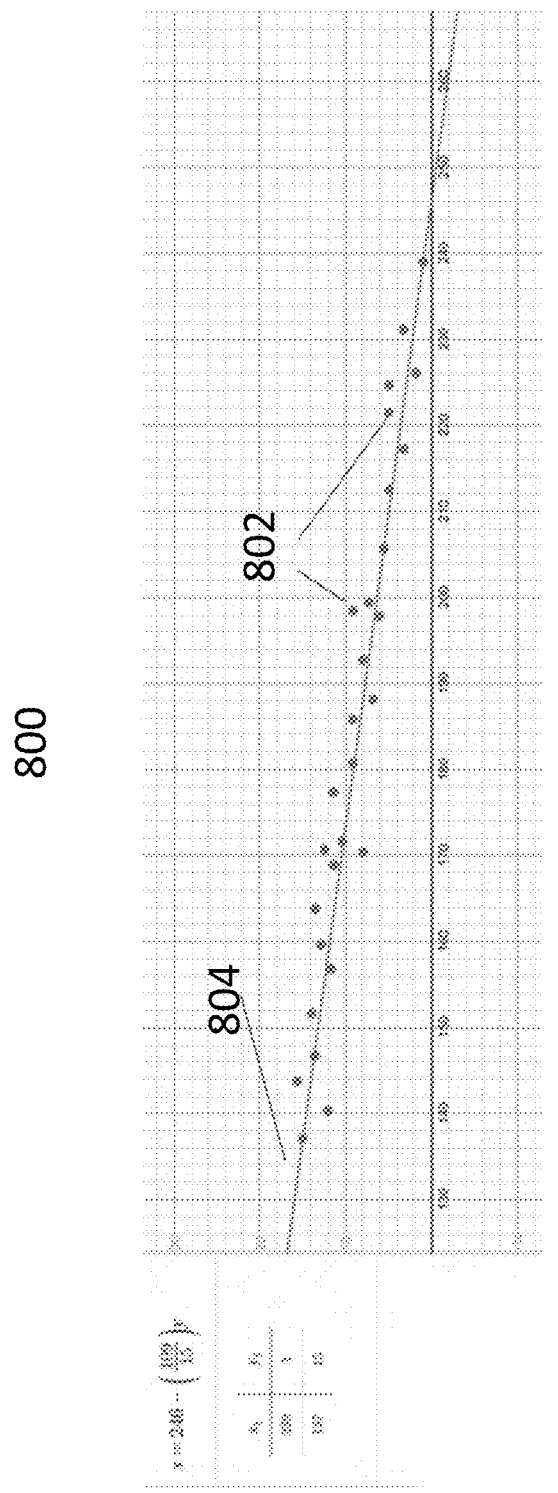
FIG. 8 is a graph showing determined brightness values of images of screens of electronic devices as processed by aspects of the image processing process of FIGS. 5A-5D according to an embodiment.

FIG. 8 shows graph 800 showing placement of brightness values collected from various samples of cracked display screens. This data assists in refining algorithms in extraction of second set of parameters used by image analysis process 210.

Figure 9:
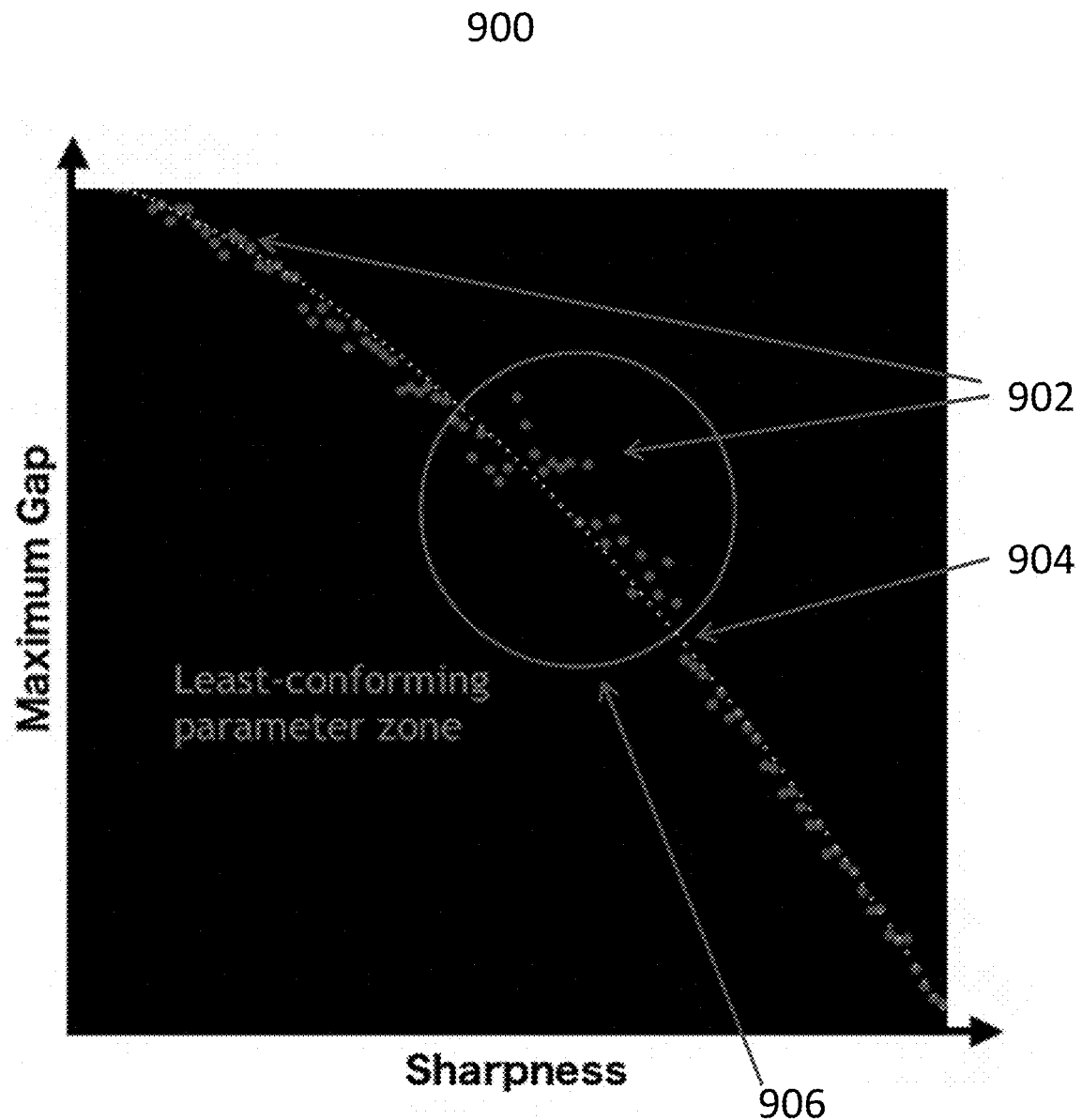
FIG. 9 is a graph showing sharpness values of images of screens of electronic devices as processed by aspects of the image processing process of FIGS. 5A-5D according to an embodiment.

FIG. 9 shows graph 900 of placement of sharpness values, collected from various samples of cracked display screens and used by line detection process 210. Zone 902 highlights samples that were not precisely conforming with the rest of samples, and therefore, lower precisions may be expected for the results. These samples may have had dark or blurry images. This data assists in refining algorithms in extraction of second set of parameters used by image analysis process 210.

Figure 10:
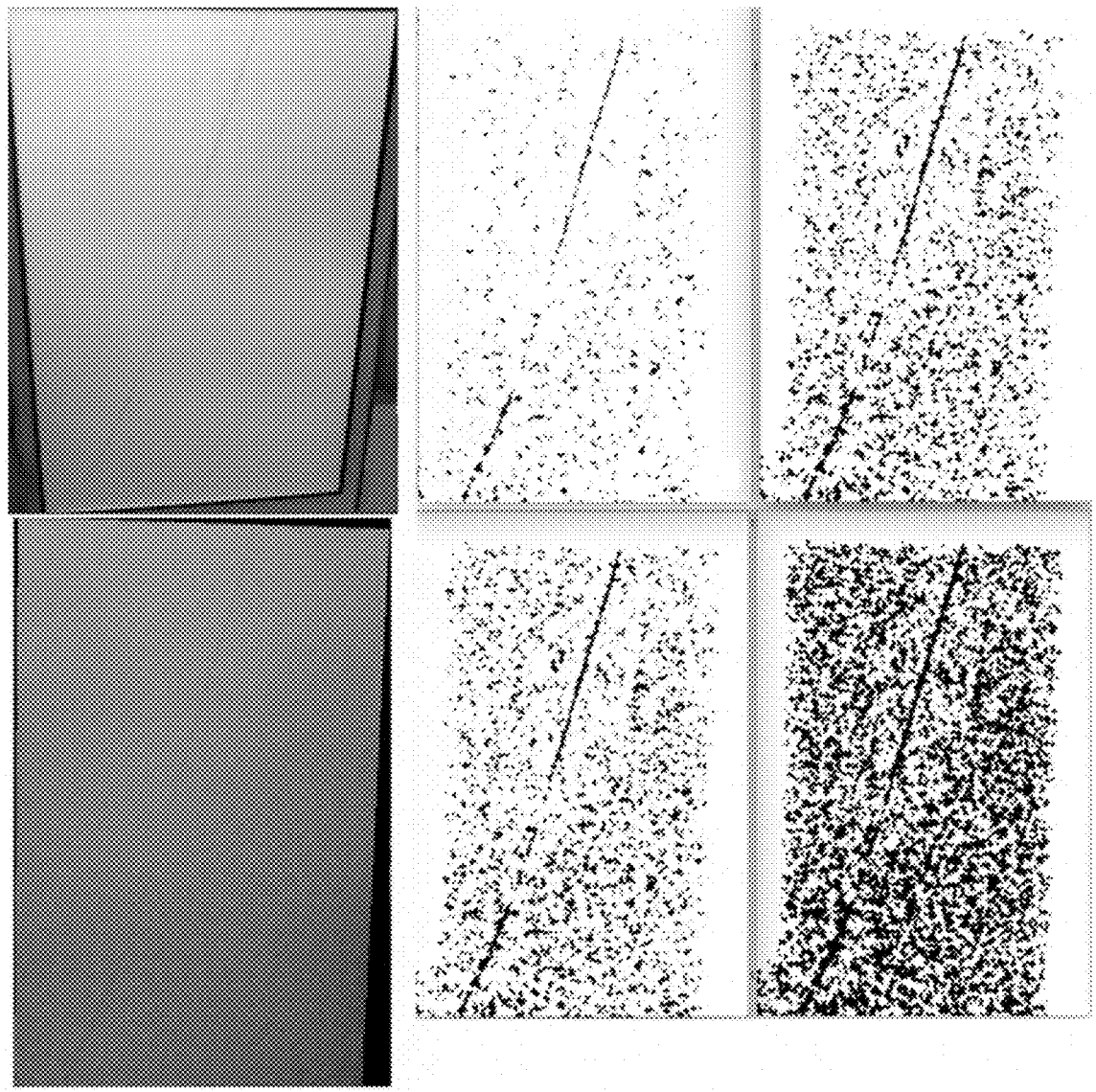
FIG. 10 is a collection of images of screens of electronic devices processed for noise attenuation as processed by aspects of the image processing process of FIGS. 5A-5D according to an embodiment.

FIG. 10 shows image 1000 illustrating a level of noise produced on lighter image (1) resulting (a) and (b), compared with darker image (2) and higher noise shown in (c) and (d).

Now, referring to FIGS. 4A-4B, FIG. 5 and FIGS. 7A-7B, further detail is provided on image analysis process 210 (FIG. 2) to detect crack(s) in display 102.

It will be appreciated that display 102 may have various types of cracks in its screen. A crack may be of various lengths, depths and locations. There may be multiple cracks (such as in shattered display). It will be appreciated that the location, length and/or depth of a crack may or may not be significant to viewing images on display 102. Severity and impact of a crack on display 102 may range from being imperceptible to critical, with exemplary categorizations such as: imperceptible; perceptible, but insignificant to viewing images on display 102; noticeable, but not significant; noticeable and prominent; significant; and critical, rendering display 102 inoperable. There may be multiple cracks, more complicated shatters or combination on display 102.

An embodiment, applies one or more detection algorithms to identify cracks in display 102. Cracks on display 102 will appear as lines with different curvature ratios, forming straight lines, curves, and extreme shatters. For crack identification by an embodiment, a crack is defined as a line that is a connected set of pixels in an image, where line has two ends and pixels in the line have a distinct darkness value compared to surrounding pixels (which are not as dark). The curvature and radius of the line may not need to be considered.

A line is defined as an element having a number of black (i.e. darker) pixels inside a bounding rectangle around a contour that correlates with a ratio of the length of longer edge to the shorter edge of that rectangle. In other words, the longer, narrower bounding rectangles around a crack should have more of their areas covered with black pixels caused by the crack. Whereas shorter, more squarish rectangles will have a smaller area covered in black pixels of the line. If the bounding rectangle is determined to be more square-like, but have most of its area in black, it may be treated as noise in the image. This will have a round footprint when converted to 1-bit black and white image since a single crack generally does not appear circular. The noise then may be filtered from the processed image by eliminating contours that have a ratio larger than a determined value.

For the purpose of describing these algorithms, the original image of display 102 presenting a "fully white" image captured by camera 106 is the "original" image processed by an embodiment.

Process 210 implements a feature extraction algorithm to identify cracks in a captured image. A crack is mathematically defined as a detected line in the captured image. The detected line may have one or more curvature(s) therein. As such, a line detection algorithm is a crack detection algorithm. One embodiment implements a probabilistic Hough line function/transform as a line detection algorithm. Briefly, a Hough line function identifies an imperfect instance of an object within a certain class of shapes. Part of the detection utilizes a voting procedure executed in a parameter space. In an embodiment, a grading procedure for identified curves is implemented and a Hough line function is applied to identify objects that are likely most likely lines in the image, which then represents most-likely-to-be cracks. A line detected in the processed image that meets certain criteria (e.g. location, length, etc.) is identified as a crack in display 102.

Generally, a Hough line function accesses a dataset (a so-called accumulator) of a two-dimensional array to detect the presence of a line. For the Hough line function, a line may be mathematically expressed in parametric form by:

$$\rho = x \cos \theta + y \sin \theta \quad \text{Equation 1}$$

where
  $\rho$ is the perpendicular distance from origin to the line; and
  $\theta$ is the angle formed by this perpendicular line and horizontal axis.

A line may be represented in terms of a function of $(\rho, \theta)$. It is noted that fixed and dynamic (variable) parameters are used by the Hough line function. Fixed parameters incorporate assumed or expected characteristics of relevant physical properties in display 102, device 100 and/or other related elements, such as: assumed dimensions or shapes of elements (e.g. an assumed characteristic of display 102 is that its shape is rectangular); expected luminance properties of the captured image (e.g. the image is expected to have a white background); assumed resolution of the processed bitmap (in the extracted active display area), which typically is expected to range from approximately a few hundred to a few of thousand pixels, for both horizontal and vertical edges. Parameters $\rho$ and $\theta$ may be fixed, where: $\rho$ represents an expected processing resolution of a bitmap of the captured image (in pixels); and $\theta$ represents an angular interval of processing for the lines (expressed in degrees or radians). For $\rho$ its resolution precision indicates a pixel offset for cells of the image being processed. If $\rho$ is set to 1 (pixel), the resolution precision for the image is that every pixel is processed, which would be the maximum precision. If $\rho$ is set to 5 pixels, the resolution precision is set to process the image at every fifth pixel. A higher $\rho$ provides a lower precision of processing of the image, but the image is processed faster, as fewer pixels are examined.

Dynamic parameters define characteristics of a line in an image that represents a crack in display 102. These include (without limitation): a minimum length of a line (expressed in a number of pixels) to be considered a crack (as opposed to noise); a maximum gap between two points (pixels) to be considered to be the same crack; a threshold of a minimum number of intersections to be detected to be considered to be a line; a minimum number of points (pixels) required to be considered to be a crack; a resolution parameter specifying an offset precision; a resolution parameter specifying an angular rotation precision; and others. An embodiment generates values for such dynamic parameters which are then provided as input(s) to the related Hough line function.

In the dataset, for each pixel at (x, y) and its neighborhood, the Hough line function applied to evaluate whether enough conditions have been met to indicate that a straight line passes through that pixel. If so, the algorithm will calculate values for parameters $(\rho, \theta)$ of that line and increment a "vote" for a bin for the dataset representing those parameters. A bin having a highest value is likely to represent a line.

One embodiment used two datasets. A first dataset tracks values of sample cracked screens against a minimum line length in a graph having a horizontal axis representing a brightness value for the pixel and a vertical axis representing a parameter for the minimum line length. From the graph, a line may be plotted and mathematically represented that identifies cracks having such a minimum length and brightness. A second dataset tracks values of sample cracked screens against a maximum gap distance of a line in a second graph having a horizontal axis representing a sharpness value for the pixel and a vertical axis representing a parameter for the maximum gap. From the second graph, another line may be plotted and mathematically represented that identifies cracks having such a maximum gap and sharpness. The two graphs may be analyzed to identify values for a minimum line length and a maximum gap by finding their y value on the vertical axis, where the x value points to on the horizontal axis.

As such, an embodiment extracts identified features from the processed image to determine raw values that require processing and transformations to refined values that are used to compute dynamic parameters for Hough line functions. These raw values are based on brightness and sharpness data extracted from images of samples of cracked displays from a sample of various devices. When an image is being processed, its brightness and sharpness values may be used to identify parameters for the Hough line functions from extracted sections from the graphs.

FIGS. 8 and 9 show graphs 800 and 900 as first and second graphs for an embodiment. Graph 800 plots (increasing) brightness values on its x-axis against (increasing) minimum line lengths on its y-axis. Again, the dataset tracked in graph 800 represent samples 802 of cracked display screens. Line 804 represents a curve fitted to the dataset and is represented by:

$$y=(246-x) \cdot 15/109 \qquad \text{Equation 2}$$

where
x is the brightness value of a display; and
y is the minimum line length for a crack on the display.
It will be seen that line 804 has a negative slope. It will be appreciated that other curves may be fitted to the plotted dataset and that other datasets may create other curves. For a captured image, using Equation 2 process 210 may provide its brightness level to determine a minimum line length value (for a crack) and that minimum line length value may be provided as a first parameter to the Hough line function. In other embodiments, a minimum line length value may be provided through other curve fitting and/or data analysis algorithms. Graph 900 plots (increasing) sharpness values on its x-axis against (increasing) maximum gap distances on its y-axis. Again, the dataset tracked in graph 900 represent samples 902 of cracked display screens. Line 904 represents a curve fitted to the dataset. It will be seen that line 904 has a negative slope. It will be appreciated that other curves may be fitted to the plotted dataset and that other datasets may create other curves. For a captured image using an equation representing line 904, process 210 may provide its sharpness level to determine a maximum gap value (for a crack) and that maximum gap value may be provided as a second parameter to the Hough line function. Non-useful samples may be disregarded, e.g. samples in zone 906 in graph 900 may be disregarded as these samples do not conform with other plotted samples. In other embodiments, a maximum gap value may be provided through other curve fitting and/or data analysis algorithms.

To detect multiple cracks, process 210 calculates parameters for a single crack detection by identifying and extracting shapes defined as "blobs" (i.e. all shapes) from the image and passing contours of the blobs obtained from original image, after noise removal is performed on the image. Then for each blob, a line detection algorithm is applied to determine if the blob meets the definition of a crack, using parameters obtained from above. Again, a probabilistic Hough line function may be applied to identify shatters.

Figure 11:
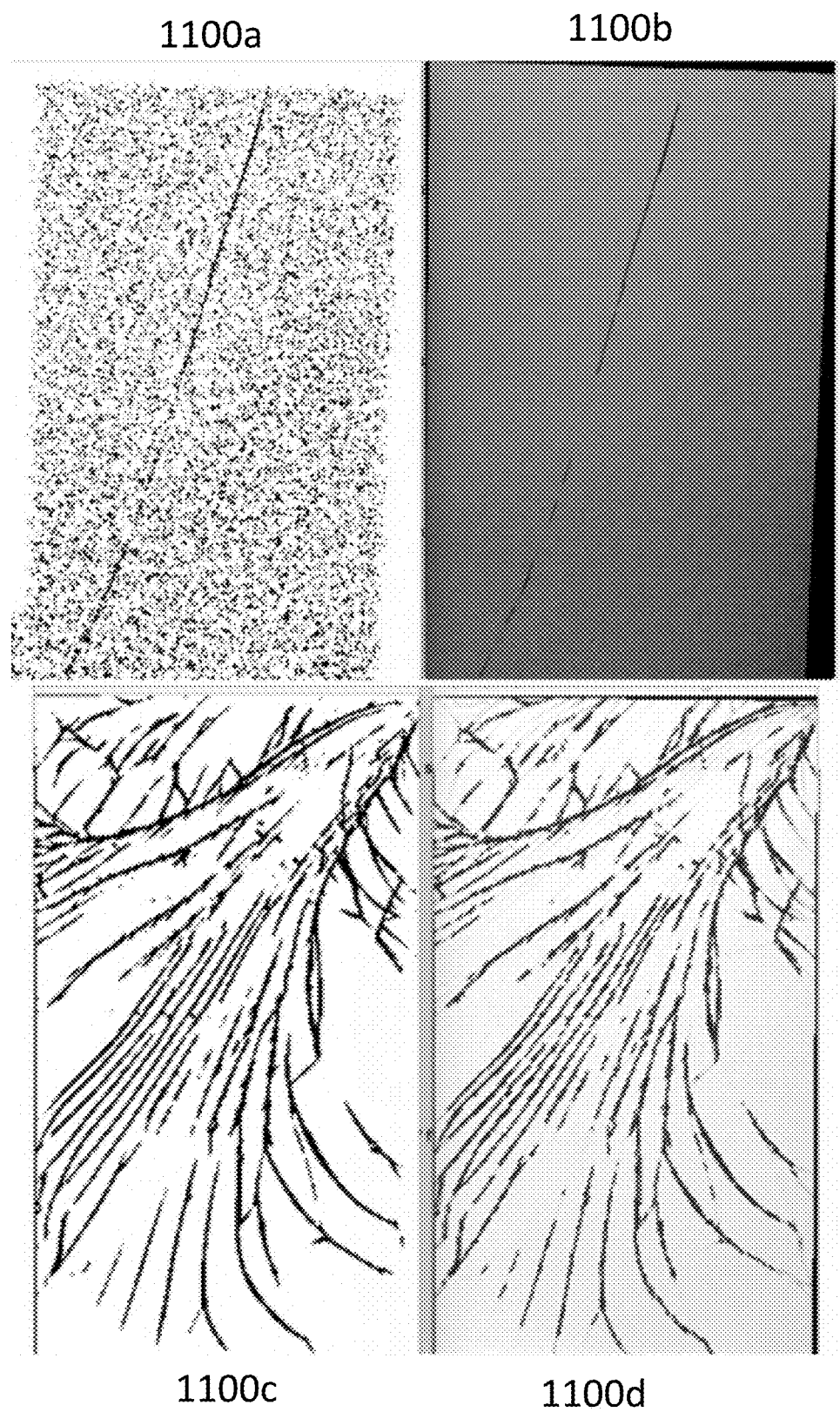
FIG. 11 is a collection of images of exemplary defects detected in electronic devices as processed by aspects of the crack detection process of FIGS. 6A-6B according to an embodiment.

FIG. 11 shows exemplary images 1100 of detected cracks resulted from the parameters applied to a Hough line function according to an embodiment, showing the noise filtered and remaining lines (cracks) 1100b and shatters 1100d.

Figure 12:
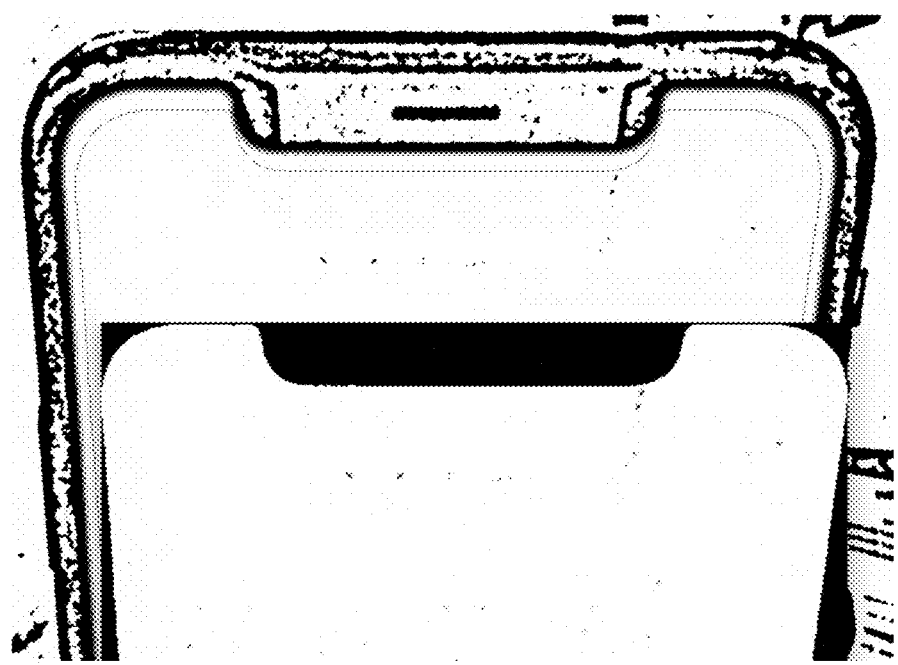
FIG. 12 is a collection of images of an exemplary image of a screen of electronic devices as processed by aspects of the image processing process of FIGS. 5A-5D according to an embodiment.

FIG. 12 shows exemplary images 1200 illustrating application of single crack analysis. Therein, several bounding rectangles are shown, representing cracks meeting conditions defined for a single crack and artefacts that do not meet the conditions.

Additional details are now provided on post-processing aspects of an embodiment.

It will be appreciated that once cracks have been identified by an embodiment for a given display 102, statistics and data may be tracked regarding device 100 and results of the analysis. Lines as identified as cracks may be quantified (e.g. location, length, depth, coverage). Quality scores for display 102 may be determined by tabulating and categorizing cracks detects and ranked for that display 102 and/or device 100. These quality scores may be used to assess a resale value for device 100. Statistics for defects and assessments for similar devices (e.g. same models, brands, manufacturers, etc.) may be tracked and used to determine a value for the current device 100 being evaluated.

As a quality control measure, individual results of several images may be combined using statistical methods to reduce probabilities of mis-identifying cracks in displays.

As part of a resale assessment tool for device 100, an image of display 102 may be provided with a report providing an assessment of display 102. The report may include results of the analysis, collected private phone information such as serial numbers. The report may be transmitted to a third party company (e.g. an insurer or purchaser) for remote assessment of a condition of device 100.

Figure 13:
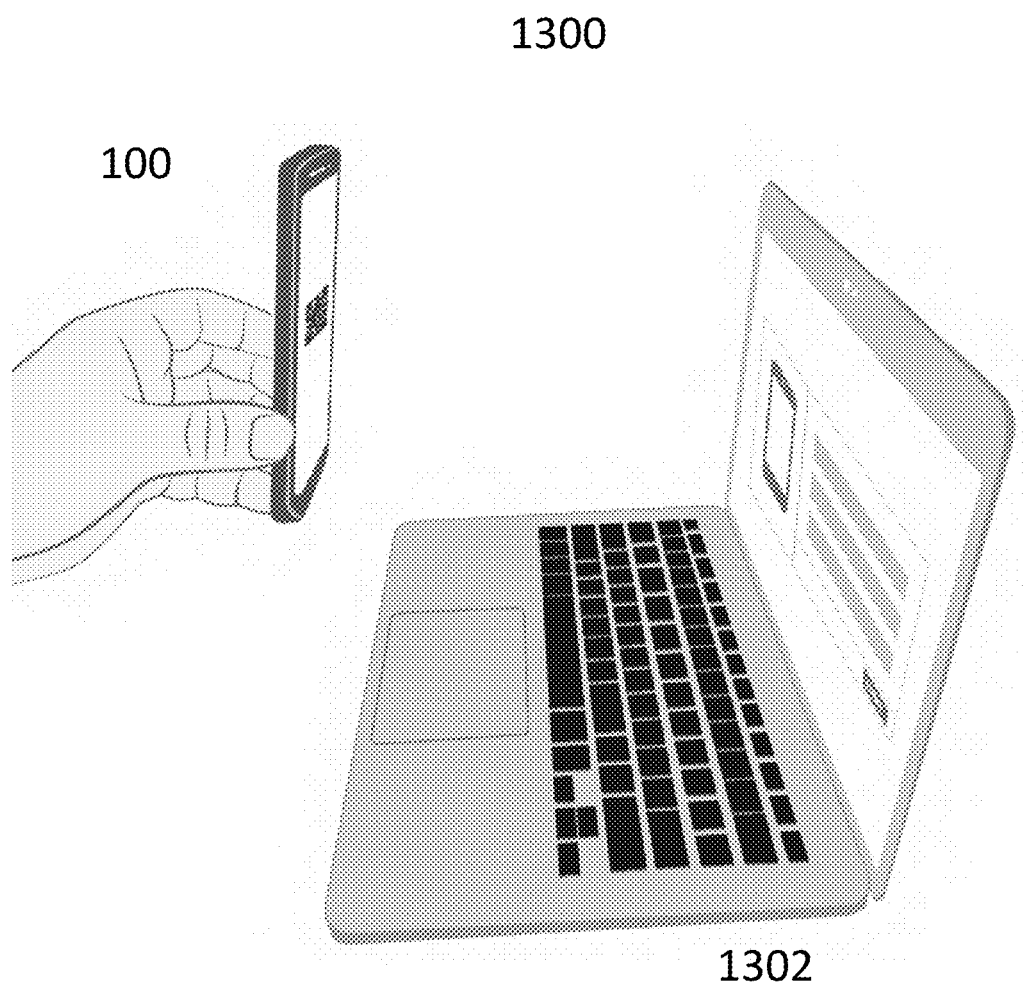
FIG. 13 shows a second embodiment using a laptop device with the electronic device of FIG. 1.

FIG. 13 shows another embodiment where in computer 1302 (here a laptop computer) has a camera, external webcam, USB camera or the like, that is used to capture images of display 102 on device 100. Device 100 and computer 1302 may be synchronized using an SMS message submitted to device 100 containing a QR code (or through an application on device 100) and an application executing on computer 1302 that may perform any parts of authentication processes for device 100 described herein.

The various features described above may be implemented in, and fully automated by processes executed by general-purpose electronic devices, including but not limited to data center servers, PCs, tablets, laptops and mobile phones. The processes may be stored in any type or types of computer storage device or memory. It should be understood that the various steps may alternatively be implemented in-whole or in-part within specially designed hardware.

It will be appreciated that all processes, algorithms, devices, modules, servers, database and elements described herein for device 100 and other processes, steps or functions in embodiments may be implemented using known programming techniques, languages and algorithms, such as Java, C++, and others. Such processes may be executed in whole or in part on one or more of devices 100 and/or servers 122. Although the processes, services and modules described herein are implemented in software operating on an electronic device having the display, it will be appreciated that some or all functions of these processes may be provided in a separate device(s) or server(s) that communicate with the electronic device. The titles of processes and platforms are provided as a convenience to provide labels and assign functions to certain processes. It is not required that a process perform only its functions as described above. As such, specific functionalities for each application or process may be moved between processes or separated into different processes. Processes may be contained within other processes. Different signaling techniques may be used to communicate information between applications using known programming techniques. Known data storage, access and update algorithms allow data to be shared between applications. It will further be appreciated that other applications and systems on devices and servers may be executing concurrently with other processes. Known mathematical algorithms, image processing algorithms, line detection algorithms may be implemented using programming techniques known in the art. As such, any of modules (or parts thereof) may be structured to operate in as a "background" application on devices and servers, respectively, using programming techniques known in the art.

It will be appreciated that the embodiments relating to clients, servers, services, state machines and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

Although this disclosure has been described in terms of certain embodiments and applications, other embodiments and applications that are apparent to those of ordinary skill in the art, including embodiments which do not provide all of the features and advantages set forth herein, are also within the scope of this disclosure. Accordingly, the scope of the present disclosure is intended to be defined only by reference to the following claims.

The invention claimed is:

1. A method for detecting a crack in a display of an electronic device, comprising:
   locating the electronic device in front of a mirror;
   aligning the electronic device to an alignment position relative to the mirror by
      generating an alignment pattern on the display through instructions executed on a processor of the electronic device; and
      controlling a focus of a front-facing camera on the device by evaluating a sharpness of a reflected alignment pattern of the alignment pattern captured in the reflected alignment pattern through instructions executed on the processor;
   generating a white screen on the display through instructions executed on the processor;
   capturing a reflected image shown in the mirror of the white screen with the front-facing camera;
   processing the reflected image to identify a line in the white screen through instructions executed on the processor; and
   determining whether the line represents a crack in the display through instructions executed on the processor.

2. The method for detecting a crack in a display as claimed in claim 1, wherein:
   the alignment pattern is a Quick Response (QR) code.

3. The method for detecting a crack in a display as claimed in claim 1, wherein processing the reflected image comprises:
   identifying a boundary of the display in the reflected image through instructions executed on the processor; and
   examining an area within the boundary for the line through instructions executed on the processor.

4. The method for detecting a crack in a display as claimed in claim 3, wherein identifying the boundary of the display comprises:
   scanning the reflected image for a set of nested contours through instructions executed on the processor; and
   identifying a smallest contour in the nested contours as the boundary through instructions executed on the processor.

5. The method for detecting a crack in a display as claimed in claim 3, wherein identifying the boundary of the display comprises:
   applying a negative complement mask to the reflected image to determine the boundary through instructions executed on the processor.

6. The method for detecting a crack in a display as claimed in claim 1, wherein:
   aligning the electronic device further comprises generating a message on the display to tilt the electronic device forward relative to the mirror; and
   processing the reflected image further comprises applying a negative complement mask to the reflected image.

7. The method for detecting a crack in a display as claimed in claim 1, wherein aligning the electronic device comprises:
   generating an image of a vertical line in a first section on the display;
   capturing a video of a reflection of the vertical line in the mirror;
   generating a video image of the reflection of the vertical line in a second section on the display located adjacent the first section; and
   determining when the vertical line aligns with the video image of the reflection of the vertical line.

8. The method for detecting a crack in a display as claimed in claim 1, wherein processing the reflected image comprises:
   applying a Hough line function to the reflected image to identify the line.

9. The method for detecting a crack in a display as claimed in claim 8, wherein parameters provided for the Hough line function comprise at least one of:
   a minimum length of a line for the crack in the reflected image;

a maximum distance of the line from other lines in the reflected image; and a threshold of a minimum number of intersections to be detected for the line.

10. The method for detecting a crack in a display as claimed in claim 9, wherein values for the parameters are derived measurements from sample displays.

11. The method for detecting a crack in a display as claimed in claim 9, wherein a first parameter value for one of the parameters is determined from an analysis of a graph of tracking samples of displays having cracks tracking minimum length against brightness.

12. The method for detecting a crack in a display as claimed in claim 9, wherein a first parameter value for one of the parameters is determined from an analysis of a graph of tracking samples of displays having cracks tracking maximum gap distance against brightness.

13. The method for detecting a crack in a display as claimed in claim 1, further comprising:
applying the Hough line function to detect multiple lines in the reflected image.

14. The method for detecting a crack in a display as claimed in claim 1, further comprising:
re-aligning the electronic device to the alignment position relative to the mirror.

15. A method for detecting a crack in a display of an electronic device after the electronic device has been located in front of a reflective surface and aligned to an alignment position relative to the reflective surface by executing instructions executed on a processor operating on the device, the method comprising:
generating an image on the display;
capturing a reflected image shown in the reflective surface of the image with a camera;
applying a Hough line function to the reflected image to identify the line using parameters provided for the Hough line function are derived measurements from sample displays and comprise at least one of:
a minimum length of a line for the crack in the reflected image;
a maximum distance of the line from other lines in the reflected image; and
a threshold of a minimum number of intersections to be detected for the line; and determining whether the line represents a crack in the display.

16. The method for detecting a crack in a display as claimed in claim 15, wherein values for the parameters are derived measurements from sample displays.

17. The method for detecting a crack in a display as claimed in claim 15, wherein a first parameter value for one of the parameters is determined from an analysis of a graph of tracking samples of displays having cracks tracking minimum length against brightness.

18. The method for detecting a crack in a display as claimed in claim 15, wherein a first parameter value for one of the parameters is determined from an analysis of a graph of tracking samples of displays having cracks tracking maximum gap distance against brightness.

19. The method for detecting a crack in a display as claimed in claim 15, further comprising:
applying the Hough line function to detect multiple lines in the reflected image.

20. An electronic device comprising:
a display on a front surface of the device;
a camera located on the front surface; and
a processor executing instructions that:
generate instructions on the display to assist a user of the device to locate the electronic device in front of a reflective surface;
generate an alignment image on the display to assist in aligning the electronic device to an alignment position relative to the reflective surface;
determine when the electronic device is at the alignment position and then
generate an image on the display;
capture a reflected image shown in the reflective surface of the image with the camera;
process the reflected image to identify a line in the image; and
determine whether the line represents a crack in the display;
and
apply a Hough line function to the reflected image to identify the line, wherein
parameters provided for the Hough line function comprise at least one of:
a minimum length of a line for the crack in the reflected image;
a maximum distance of the line from other lines in the reflected image; and
a threshold of a minimum number of intersections to be detected for the line;
and
a first parameter value for one of the parameters is determined from an analysis of a graph of tracking samples of displays having cracks tracking minimum length against brightness.

* * * * *